April 1, 1952 J. MICHAL 2,591,579

PERMANENT-SIGNAL INDICATING SYSTEM

Filed Oct. 29, 1948 14 Sheets-Sheet 1

INVENTOR
J. MICHAL
BY: C. Mattice
ATTORNEY

April 1, 1952 J. MICHAL 2,591,579

PERMANENT-SIGNAL INDICATING SYSTEM

Filed Oct. 29, 1948 14 Sheets-Sheet 2

INVENTOR
J. MICHAL

BY C. Mattice

ATTORNEY

TEST SELECTOR CIRCUIT

INVENTOR
J. MICHAL
BY C. Mattice
ATTORNEY

PERMANENT SIGNAL HOLDING TRUNK

INVENTOR
J. MICHAL
BY C. Mathis
ATTORNEY

INVENTOR
J. MICHAL
BY: C. Mathie
ATTORNEY

INVENTOR
J. MICHAL
BY: C. Mattice
ATTORNEY

April 1, 1952 J. MICHAL 2,591,579

PERMANENT-SIGNAL INDICATING SYSTEM

Filed Oct. 29, 1948 14 Sheets-Sheet 7

INVENTOR
J. MICHAL
BY: C. Mattice
ATTORNEY

CONCENTRATING CIRCUIT

INVENTOR
J. MICHAL
BY: C. Mattice
ATTORNEY

PERMANENT-SIGNAL INDICATING SYSTEM

Filed Oct. 29, 1948 14 Sheets-Sheet 9

INVENTOR
J. MICHAL
BY C. Mattice
ATTORNEY

April 1, 1952 J. MICHAL 2,591,579

PERMANENT-SIGNAL INDICATING SYSTEM

Filed Oct. 29, 1948 14 Sheets-Sheet 10

CONCENTRATING CIRCUIT

INVENTOR
J. MICHAL
BY: C. Mathie
ATTORNEY

PERMANENT SIGNAL TRUNK CIRCUIT

INVENTOR
J. MICHAL
BY: C. Mathie
ATTORNEY

April 1, 1952 J. MICHAL 2,591,579

PERMANENT-SIGNAL INDICATING SYSTEM

Filed Oct. 29, 1948 14 Sheets-Sheet 12

INVENTOR
J. MICHAL
BY: C. Mattice
ATTORNEY

PERMANENT-SIGNAL INDICATING SYSTEM

Filed Oct. 29, 1948 14 Sheets-Sheet 13

INVENTOR
J. MICHAL
BY C. Mattice
ATTORNEY

April 1, 1952 J. MICHAL 2,591,579

PERMANENT-SIGNAL INDICATING SYSTEM

Filed Oct. 29, 1948 14 Sheets-Sheet 14

INVENTOR
J. MICHAL
BY: C. Mattice
ATTORNEY

Patented Apr. 1, 1952

2,591,579

UNITED STATES PATENT OFFICE 2,591,579

PERMANENT-SIGNAL INDICATING SYSTEM

Joseph Michal, Jackson Heights, N. Y., assignor to Bell Telephone Laboratories, Incorporated, New York, N. Y., a corporation of New York Application October 29, 1948, Serial No. 57,381

9 Claims. (Cl. 179—27)

This invention relates to automatic telephone systems and has for its object the more efficient handling of falsely initiated calls, commonly called permanent signals.

The handling of such calls is comparatively simple in telephone offices where a force of operators and maintenance personnel is at hand. In offices that are normally unattended, such calls must be extended to an attended office and means must be provided both to transmit information to that office as to the nature of the line in trouble and to permit the operator at the attended office to control the equipment at the unattended office in an effort to bring about removal of the permanent signal condition. In addition, when maintenance personnel visit the unattended office they must also have means to identify the line on which the permanent signal exists and an indication of the type of line.

In accordance with the present invention the existence of a permanent signal condition on a subscriber's line results in the connection of the line with a permanent signal trunk circuit having means for transmitting a class of line signal to both a local desk and a desk at a remote office.

Means is provided whereby response to the class of line signal at either desk renders response at the other desk ineffective.

In addition the permanent signal trunk circuit, when connected with a line, is automatically associated with one of a plurality of interoffice trunk circuits. These interoffice trunk circuits are provided with a plurality of signal controlling means at the local end and with a plurality of class indicating means at the remote end. Means is provided under the control of the permanent signal trunk for selectively operating the class indicating means, while means is provided under the control of an operator at the remote end, to selectively operate the signal controlling means.

Means is also provided under the control of the operating means for a particular class indication for preventing the effective operation of a particular signal controlling means.

These and other features of the invention will be more clearly understood from a consideration of the following description read in connection with the accompanying drawing, in which:

Fig. 1 is a schematic showing of a telephone system in which the detailed circuits may be employed;

Fig. 15 shows the manner in which Figs. 2 to 14 are to be arranged.

Figures 1, 15:
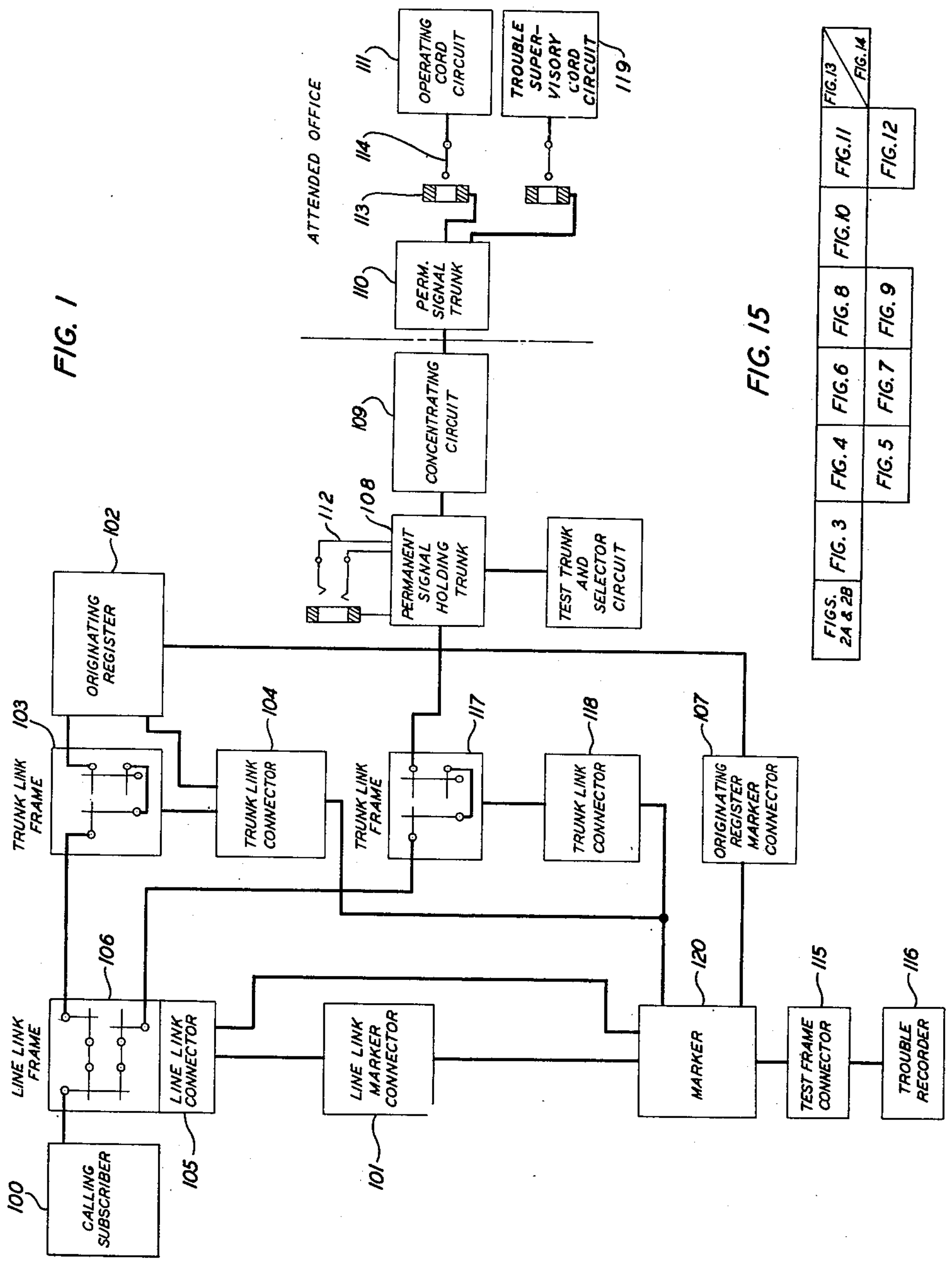

The permanent signal holding trunk of the present disclosure is particularly designed for use in the telephone system disclosed in the patent to A. J. Busch, Serial No. 2,585,904, granted February 19, 1952, to which reference is made for a complete description of the operations performed in connecting the line on which the permanent signal occurs to the permanent signal holding trunk.

For convenience in identifying the location and functions of various relays in the circuit, letter designations have been employed, a numeral in parenthesis indicating the figure in which the particular relay appears.

When the calling subscriber at the substation 100 initiates a call, a connection is established from the line link frame 106, on which the calling line terminates, to an idle marker indicated by box 120. Access to the marker 120 is gained through the line link marker connector 101 which connects only such leads as are necessary to identify the line link frame to the marker by its frame number, to identify the group in which the calling line is located and to inform the marker that a dialing connection is to be established. The marker then proceeds to select an idle originating register such as originating register 102.

Originating registers are distributed over the trunk link frames. By means of test leads extending from the registers to the marker, the marker determines which trunk link frames have idle registers and which frames are not being used by other markers. It then preferentially selects an idle frame with idle registers and connects with the trunk link frame 103 having access to originating register 102 by means of the trunk link connector 104 associated with trunk link frame 103 and through that connector with the register 102.

The location of the calling line is begun as soon as the marker is seized and continues while the marker is selecting an idle register, the line location being indicated in terms of the line link frame, the vertical group, and the horizontal group. When the marker has seized the trunk link frame, it also seizes line link frame 106 through the associated line link connector 105 and connects with the previously identified horizontal group. The marker then completes the identification of the vertical file containing the calling line and of the calling line itself and passes the complete line identification to the originating register 102.

The marker then proceeds to test the ten channels which may be used to connect the calling line 100 with register 102, selects the lowest numbered available channel and operates the select and hold magnets on the line link frame and trunk link frame to establish the connection. After the channel has been established and checked, the marker releases leaving the connection held under the control of the calling subscriber.

The calling subscriber then receives dial tone from the originating register. Normally the subscriber responds by dialing the digits of the wanted line number including an office designation and a numerical designation which are registered in the originating register. After the entire number has been dialed the register calls in a marker over the originating register marker connector 107 and transmits to the marker the calling line location and the complete called line designation. From the office designation, the marker operates a route relay which determines the routing of the desired connection and controls the completion of the connection as described in the above-identified Busch patent.

If the calling subscriber fails to operate his dial following the receipt of dial tone, a timing circuit in the originating register functions to operate a permanent signal relay. The operation of the permanent signal relay serves to call in a marker over the originating register marker connector 107, after which the marker receives the calling line location and an indication of the permanent signal condition and operates a special permanent signal route relay.

The route relay identifies the route to be used and controls the operation of the marker to test for a trunk link frame not in use by another marker and having an idle permanent signal holding trunk, to connect with that frame, and to select an idle trunk thereon. The selected frame may be the same frame as used for connecting with the register or may be a different frame, for example frame 117. The marker then connects with the line link frame 106 at which the calling line appears, and tests for an idle channel for connecting the calling line with the selected permanent signal holding trunk such as trunk 108. Having selected an idle channel the marker transmits a signal to the originating register which releases the dialing connection. The marker then operates the select and hold magnets of the selected channel to complete the connection which is held under the control of the calling line. Prior to releasing, the marker seizes the trouble recorder 116 through the test frame connector 115 and makes a record of the calling line on which the permanent signal occurred.

As will be described in detail hereinafter, the seizure of trunk 108 initiates the operation of the concentrating circuit 109 which connects trunk 108 with a permanent signal trunk 110 at an attended office. The trunk 108 simultaneously transmits a class of line identification to the trunk 110 at the distant office and to a test desk 112 at the local office. In general, the operator at the attended office will respond to this identification by inserting the plug 114 of her cord 111 into jack 113 and attempt to dispose of the permanent signal condition. Response by the operator renders the local connecting equipment ineffective. If a member of the maintenance force happens to be present at the normally unattended office, he may use the equipment at the test desk to respond to the permanent signal, and such response, prior to response at the attended office, disconnects the trunk from that office, and extinguishes the signal thereat.

Figure 4:
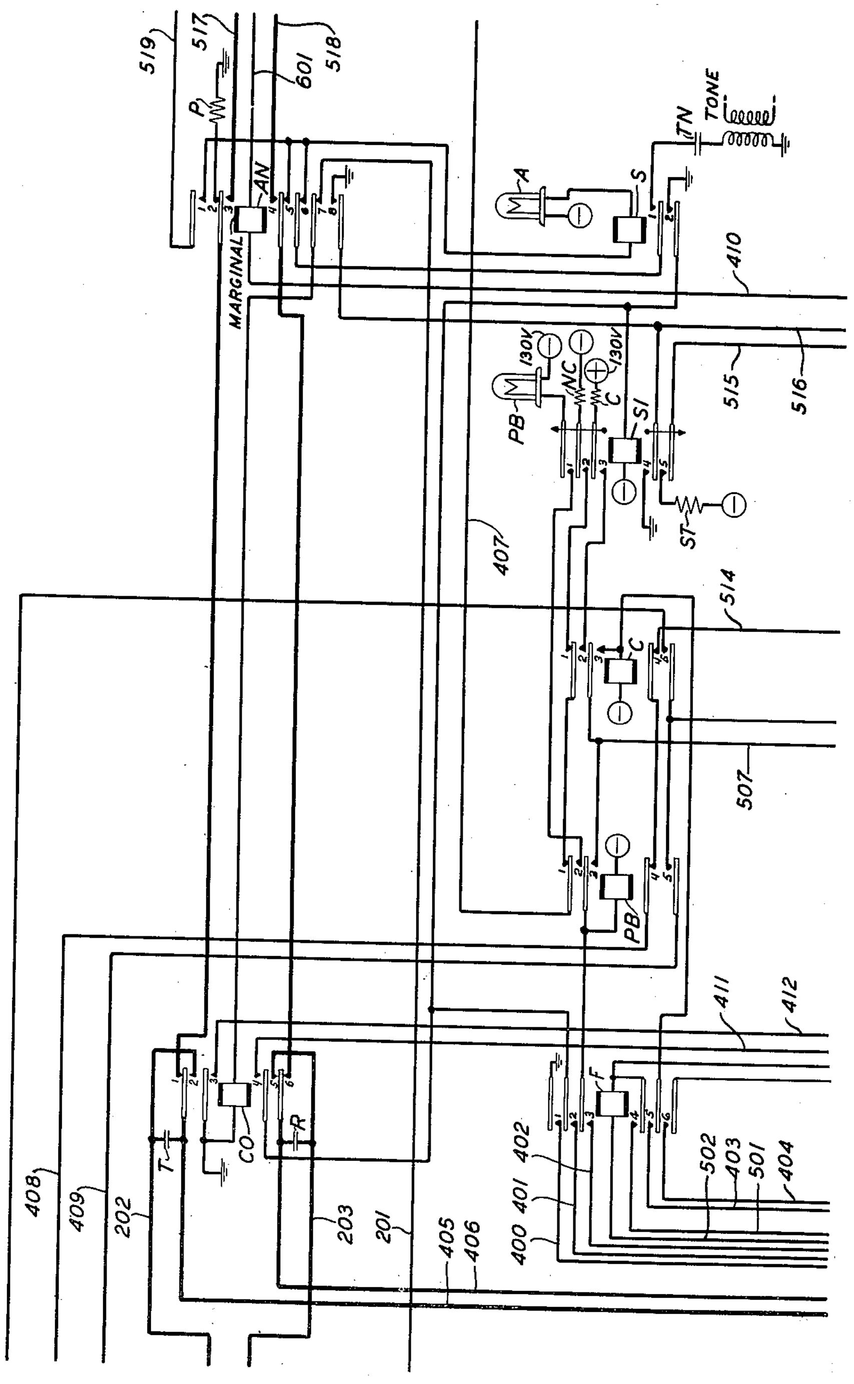
Figs. 4 and 5 show a permanent signal holding trunk to which a line on which a permanent signal occurs may be connected.
Figure 5:
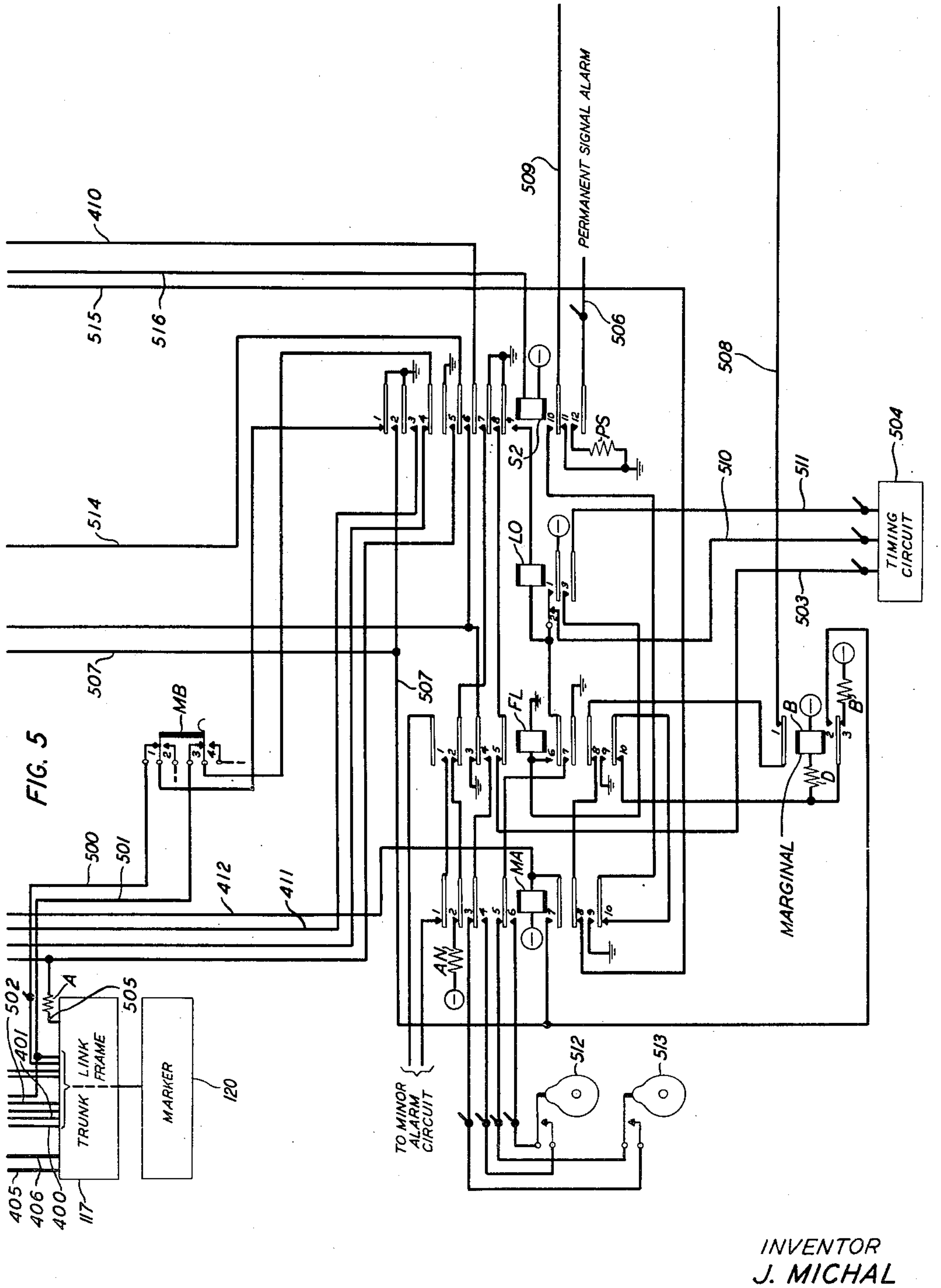
Figure 6:
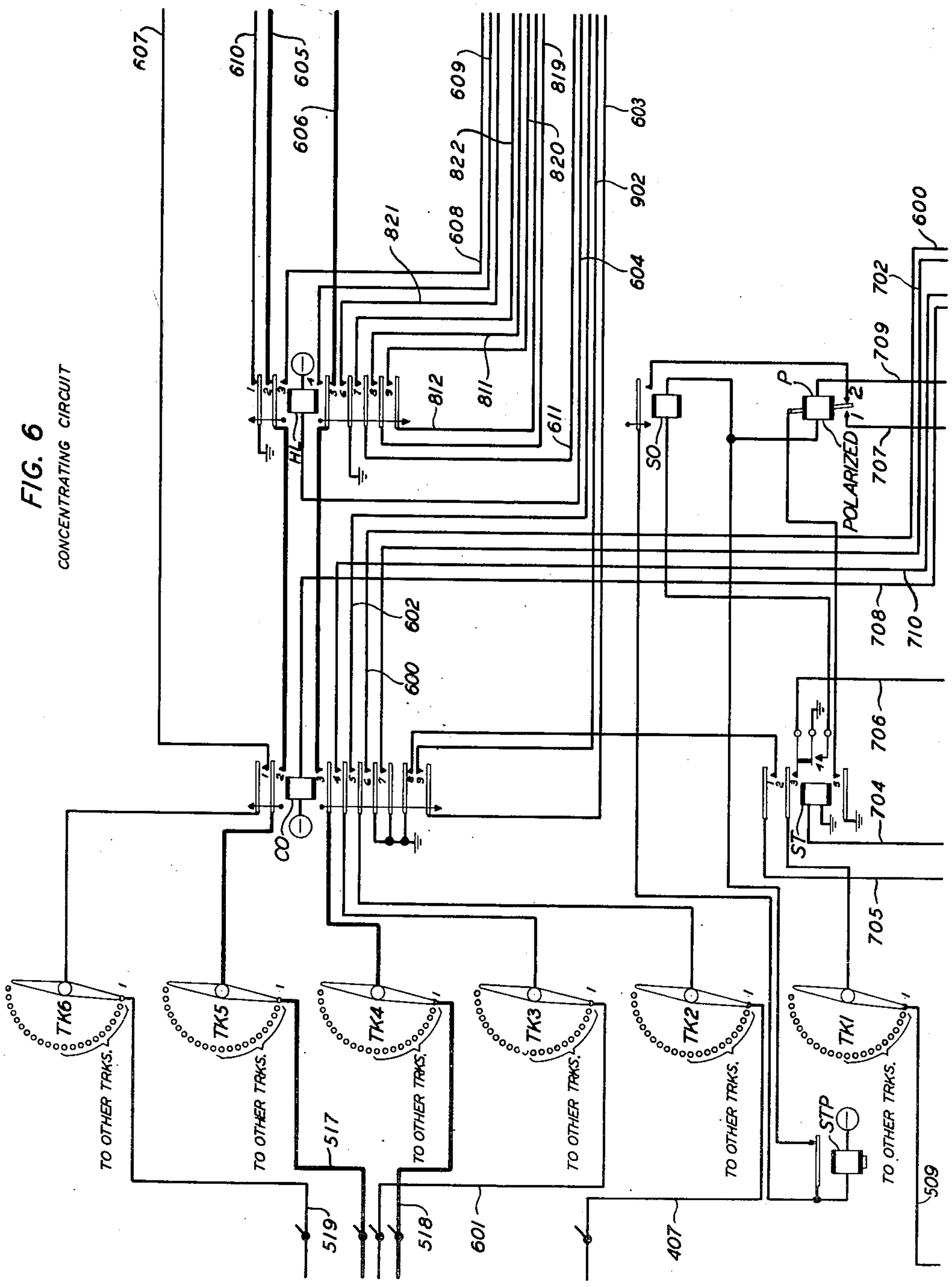
Figs. 6 to 10 show one of a plurality of concentrating circuits for connecting the permanent signal holding trunk of Figs. 4 and 5 to a remote office.
Figure 7:
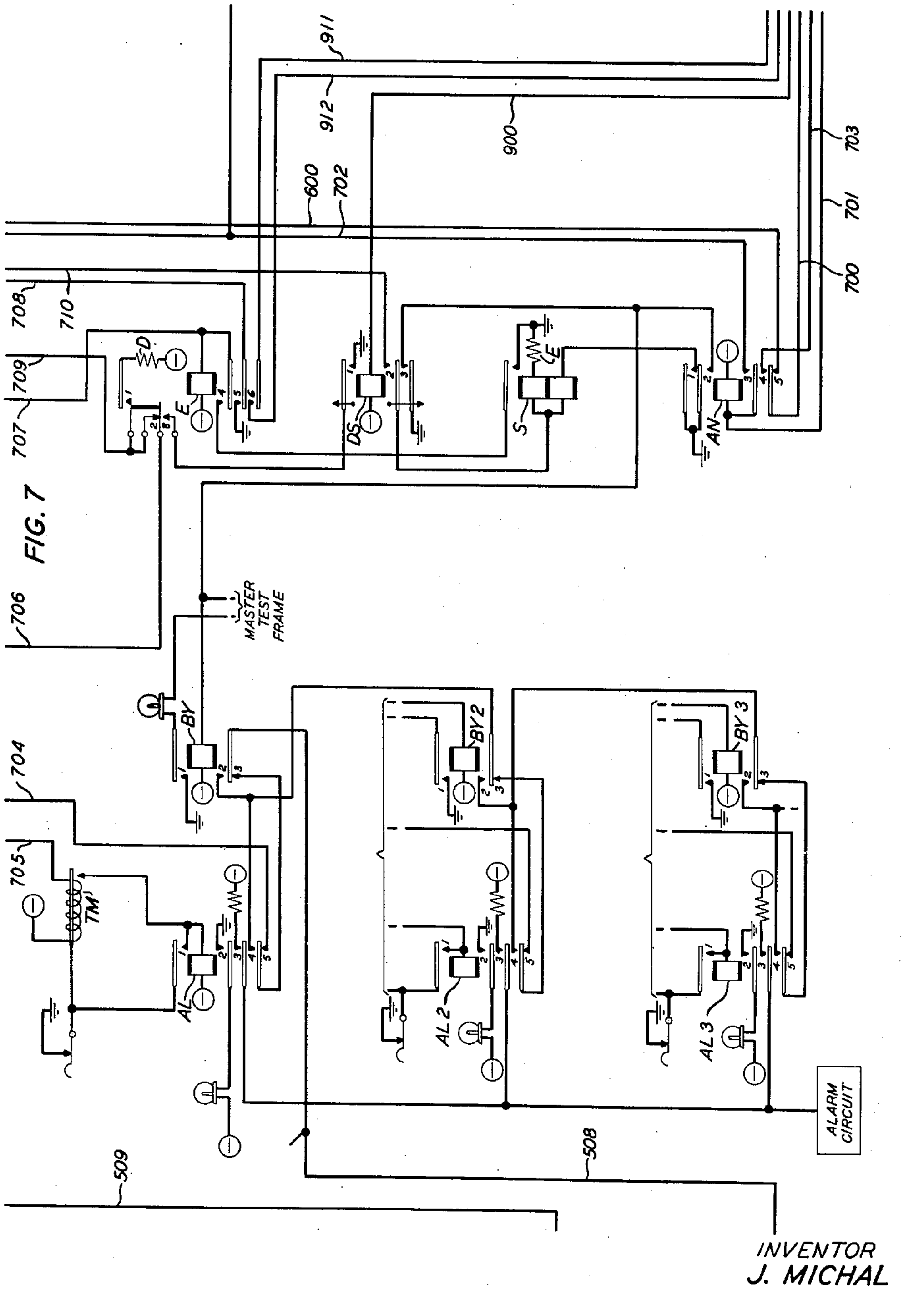
Figure 8:
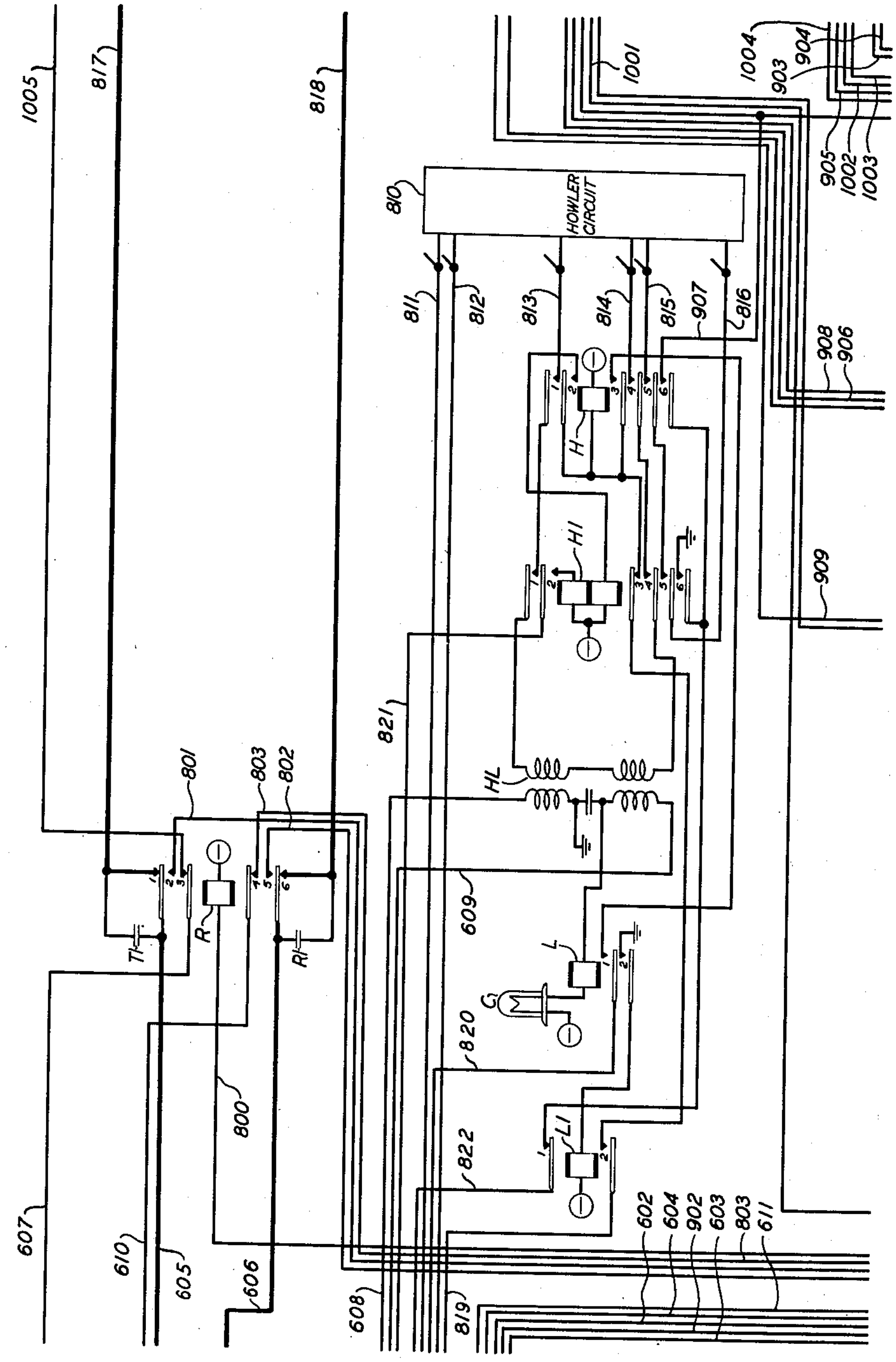
Figure 9:
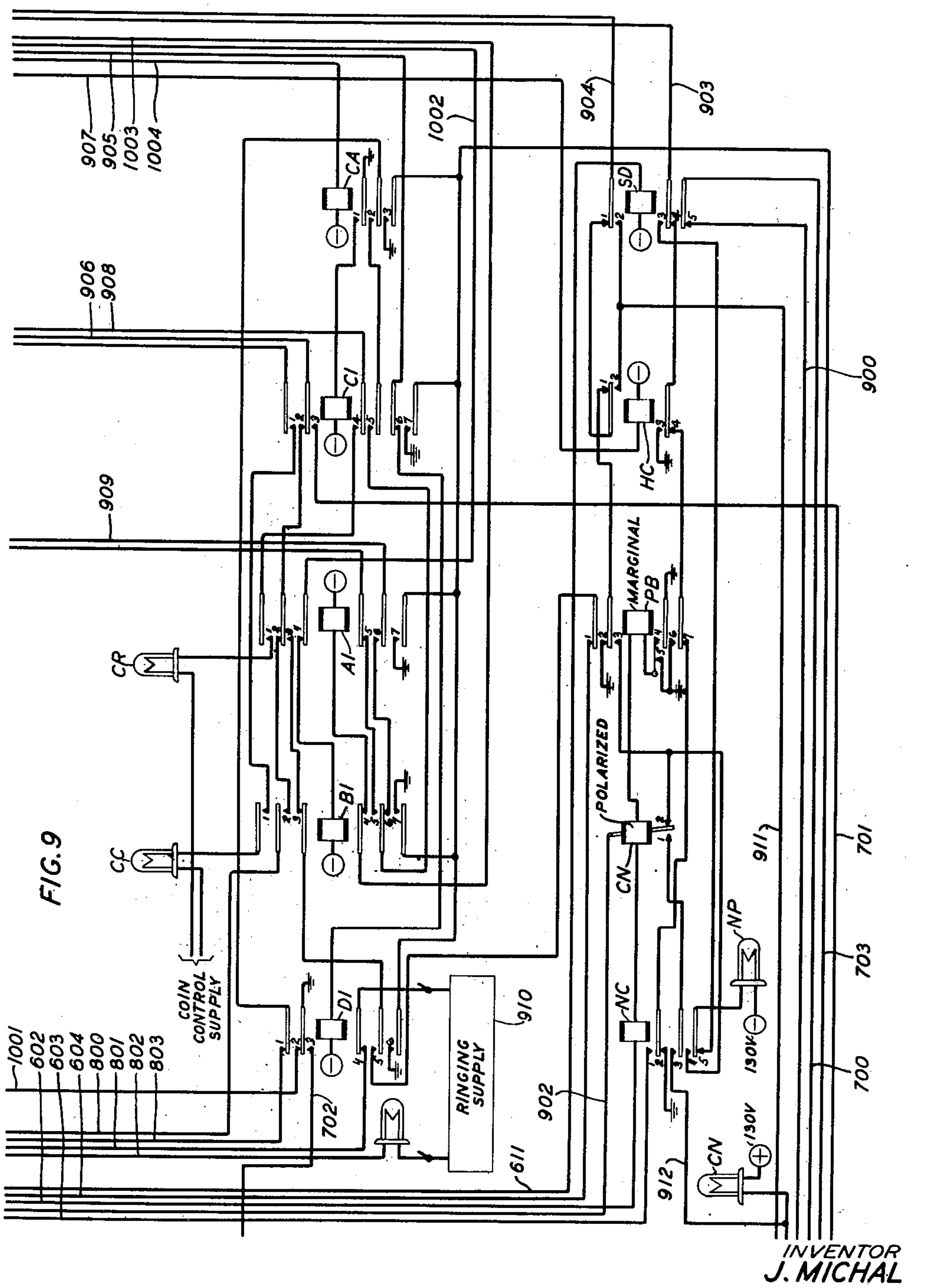
Figure 10:
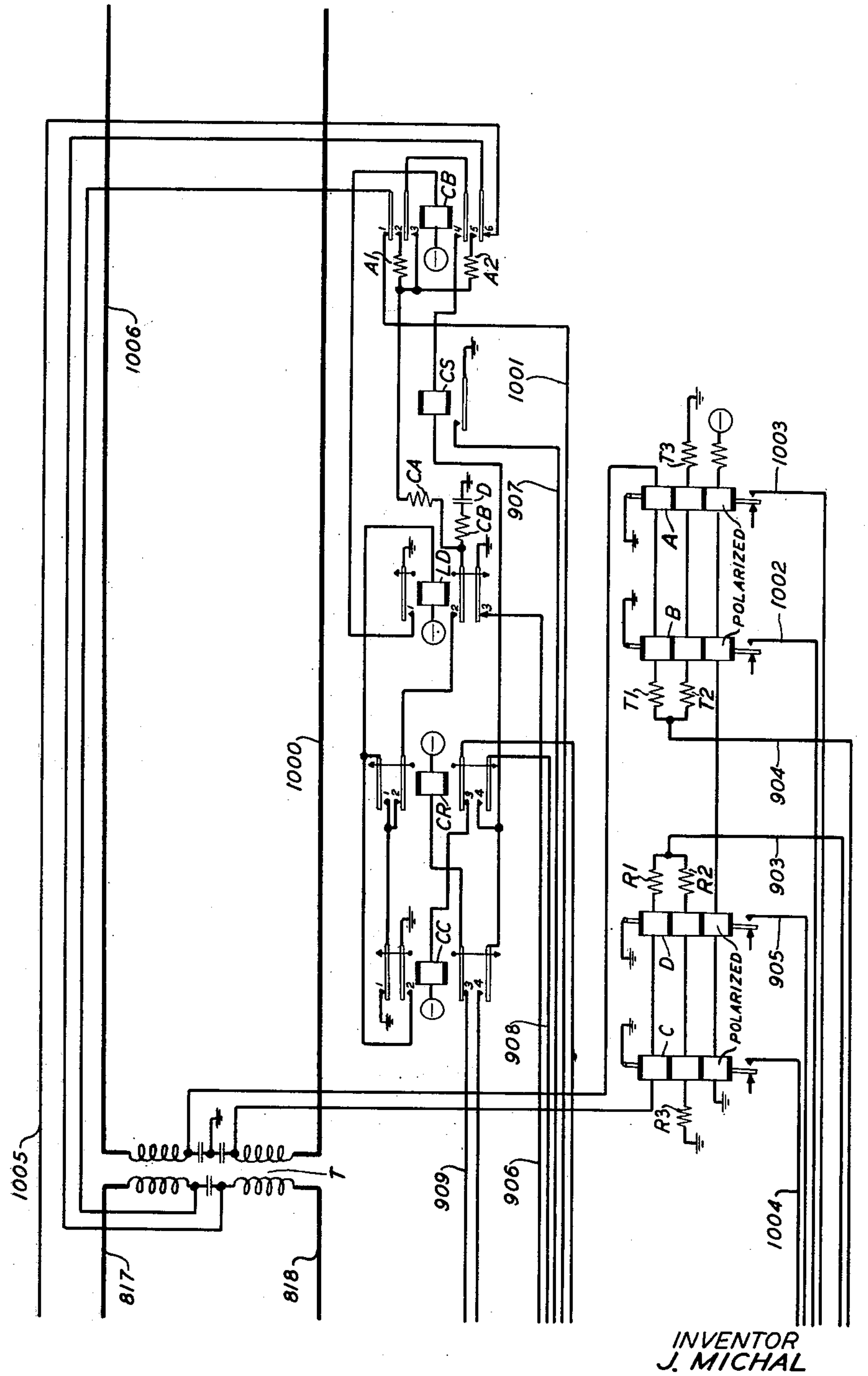
Figure 11:
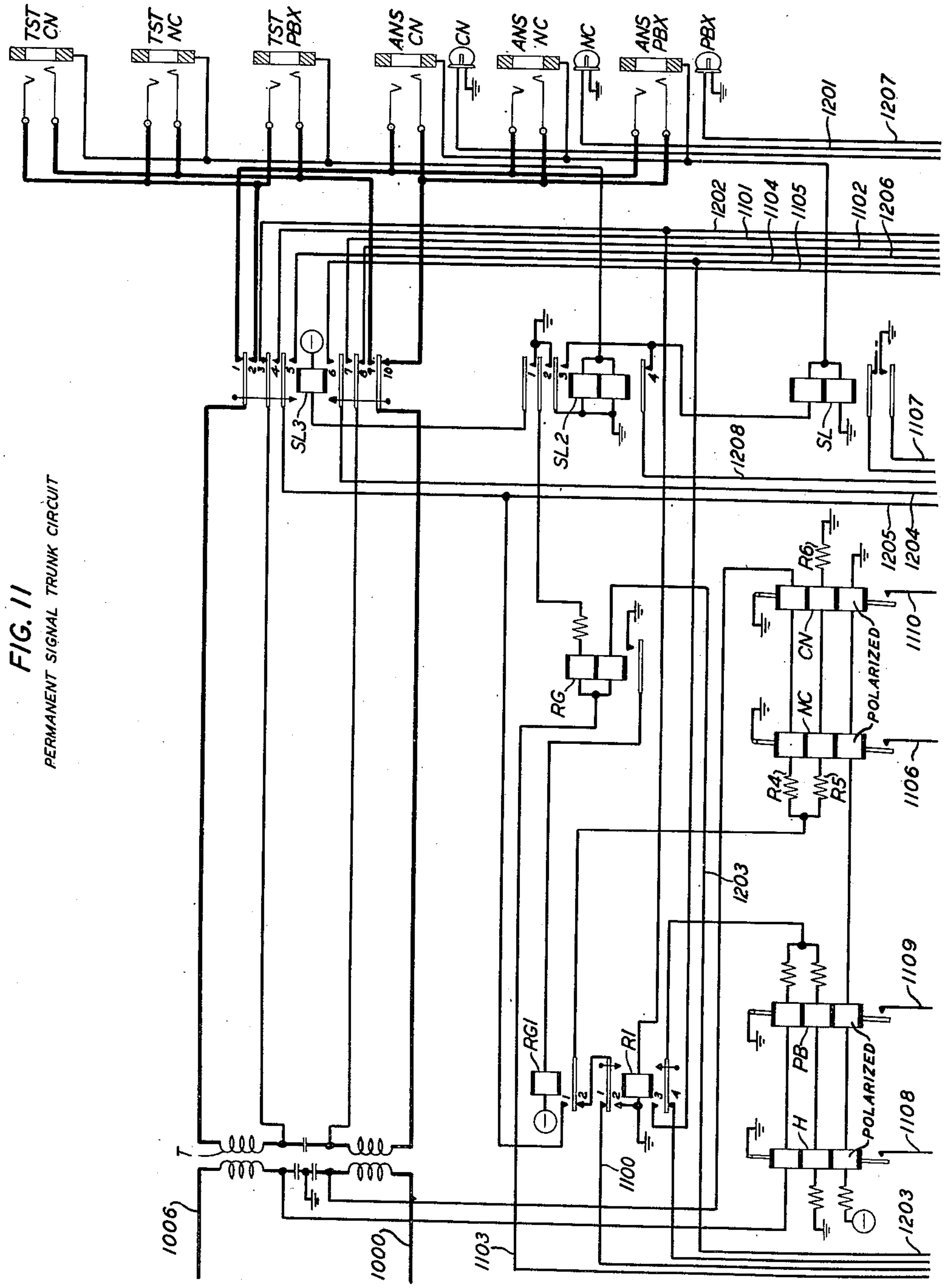
Figs. 11 and 12 show the circuits at the remote office to which the concentrating circuit of Figs. 6 to 10 is connected.
Figure 12:
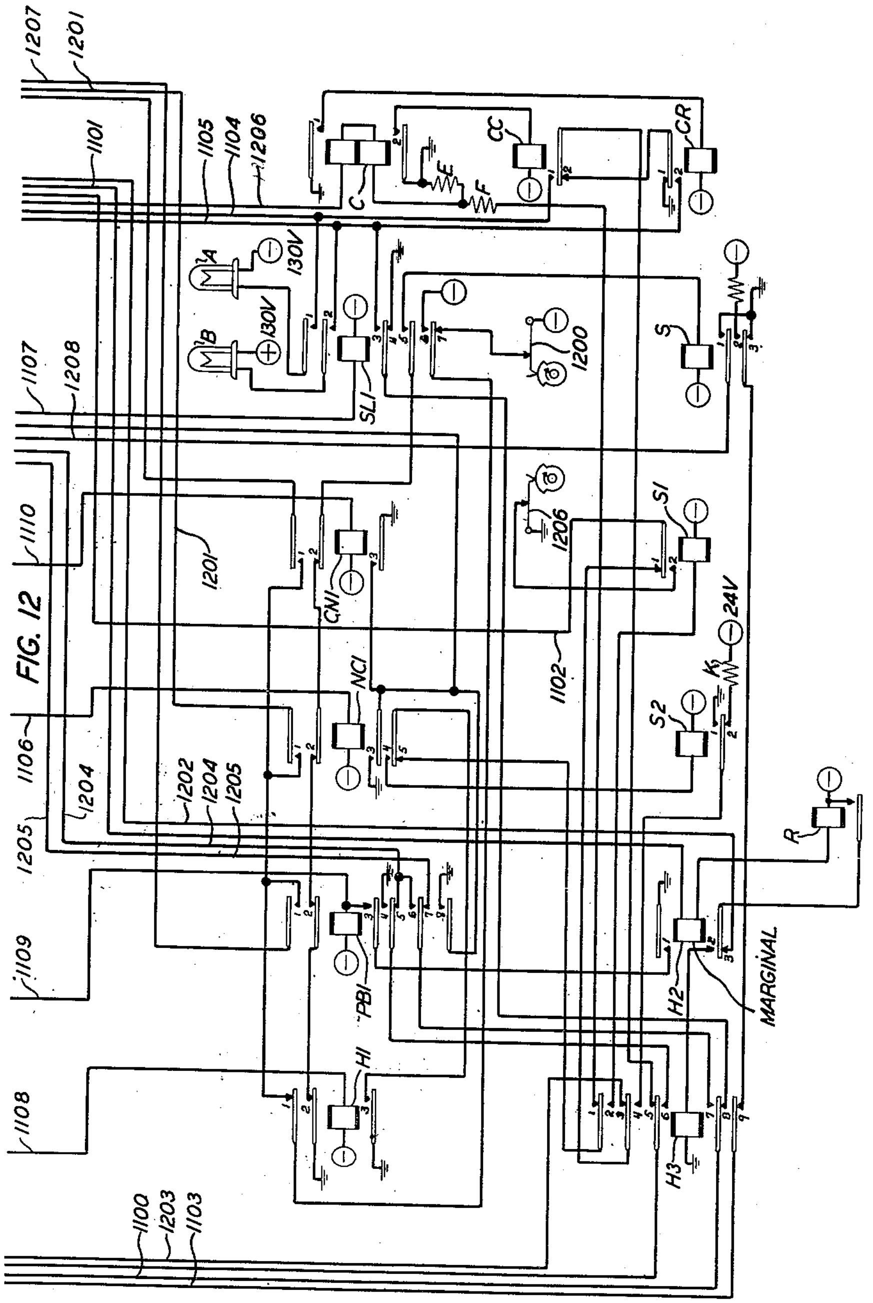

Turning now to the detailed circuits, when the marker 120 is notified by an originating register such as register 102, that a permanent signal exists on a subscriber's line, it will connect the line to an idle trunk of the type shown in Figs. 4 and 5. When the trunk is idle it connects ground over contact 1 of relay S2(5), contact 2 of make busy key MB(5) to conductor 500, which is individual to the trunk link frame 117 on which the trunk appears. If other trunks of this type appear on this frame they will also ground conductor 500 when idle. The marker uses this ground to identify and select a trunk link frame having at least one idle permanent signal holding trunk.

Assuming that frame 117 is selected, the marker then connects ground to conductor 501 and battery to conductor 502 of the trunk of Figs. 4 and 5 and makes similar connections to any other trunks of this type on frame 117. When the trunk is idle, conductor 501 is connected over contact 3 of key MB(5) contact 4 of relay S2(5), through the winding of relay F(4) to conductor 502, to complete a circuit for a relay in the marker, the current flow being insufficient to operate relay F(4). Similar circuits are completed by other idle trunks. The marker then selects an idle trunk and reduces the resistance in the circuit of the F relay of the selected trunk, causing that relay to operate.

Assuming that the trunk of Figs. 4 and 5 is selected, relay F(4) operates, locking over its contact 4 to ground on conductor 501. At contact 1 relay F(4) connects ground to conductor 400 to control the establishment of temporary control connections at the trunk link frame between the marker and the trunk and at contacts 2, 3 and 5 connects relays S1(4), PB(4) and C(4) to conductors 401, 402 and 403 leading to the trunk link frame, where they are extended to the marker.

The marker then grounds conductor 401, operating relay S1(4). Relay S1(4) at contacts 1, 2 and 3 prepares class signal circuits to be described later. At contact 4 it closes a circuit over conductor 516 for operating relay S2(5) and at contact 5 closes a start circuit for the concentrating circuit of Figs. 6 to 10.

Relay S2(5) at contact 1 disconnects ground from conductor 500. If the trunk of Figs. 4 and 5 is the only permanent signal holding trunk appearing on frame 117, this removal of ground from conductor 500 marks the frame busy to the markers. If there are other trunks of this type which are idle, ground is still connected to the conductor from such other trunks. At contact 4, relay S2(5) opens the operating path for relay F(4) to mark the individual trunk busy. At contact 8, relay S2(5) connects ground over contact 5 of relay FL(5) to the start conductor 503 for timing circuit 504 and at contact 9 connects ground to the winding of relay LO(5) to prepare that relay for operation under the control of the timing circuit.

At contact 12 relay S2(5) connects ground through resistance PS to conductor 506 to control the permanent signal alarm which is arranged to operate if more than a predetermined number of permanent signal trunks are in use at the same time.

At contact 2 relay S2(5) connects ground to conductor 507 to supply locking ground for relays PB(4), C(4), MA(5) and B(5) when these relays operate.

At contact 5, relay S2(5) connects ground through resistance A(5) to the incoming sleeve conductor 505 to hold the line link and trunk link hold magnets operated.

A branch of this circuit extends over contact 6 of relay F(4) to conductor 404 leading to the marker as an indication that the trunk is ready to receive the class of the calling line.

The marker responds to ground on conductor 404 by operating relay C(4) if the calling line is equipped with a coin box, by operating relay PB(4) if the calling line is a private branch exchange trunk or by operating neither if the calling line is neither a coin line nor a private branch exchange line.

Either relay C(4) or relay PB(4), when operated, locks over conductor 507 to ground under the control of relay S2(5).

The marker then opens the circuit of relay F(4). When relay F(4) releases it opens the operating circuits for relays S1(4), C(4) and PB(4), releases a relay at the trunk line frame which connects the calling line through to this trunk, completing a circuit from ground through resistance P(4), contact 2 of relay AN(4), contact 1 of relay CO(4), tip conductor 405, through the trunk link switches and line link switches to the calling line and back through the line and trunk link switches to ring conductor 406, contact 6 of relay CO(4), contact 5 of relay AN(4), winding of relay S(4) through resistance lamp A(4) to battery. Relay S(4) operates in this circuit, at contact 2 closing a holding circuit for relay S1(4) which is slow to release and therefore holds its contacts closed over the interval between the release of relay F(4) and the operation of relay S(4). At contact 1 relay S(4) connects a high tone through condenser TN(4) over contacts 6 and 5 of relay AN(4) to the ring conductor to aid the maintenance personnel in tracing the line that has been connected to the trunk.

Assuming that the calling line is neither a coin line nor a private branch exchange line, so that neither relay C(4) nor relay PB(4) has been operated, central office battery is connected through resistance NC(4), contact 2 of relay S1(4), contact 1 of relay C(4), contact 1 of relay PB(4) to conductor 407 leading to the concentrating circuit to prepare a class of line signal for the operator at the attended office. At the same time ground is connected over contact 3 of relay FL(5), contact 6 of relay S2(5), conductor 514, contact 4 of relay C(4), contact 4 of relay PB(4), conductor 408 to battery through lamp NC(2) associated with jack 200 connected to the trunk of Figs. 4 and 5 at the local test desk as an indication that a line has been connected to this trunk and that the line is neither a coin line nor a private branch exchange line.

When relay S1(4) operated as previously described, a circuit was closed from battery through resistance ST(4), contact 5 of relay S1(4), conductor 515, contact 8 of relay MA(5), contact 8 of relay FL(5), contact 1 of relay B(5), to the start conductor 508 leading to the concentrating circuits.

There may be several of these concentrating circuits all of which have access to all of the permanent signal holding trunks. Start conductor 508 is common both to the trunks and the concentrating circuits, extending in multiple to the trunks and being advanced from one concentrating circuit to the next as such circuits are taken for use. Conductor 508 normally extends over contact 3 of relay BY(7), contact 5 of relay AL(7) and conductor 704 to the winding of start relay ST(6) of the first concentrating circuit and ground. Relay S2(5) when operated, at contact 11 disconnects ground from conductor 509 and extends that conductor to battery over its contact 10, contact 10 of relay MA(5), contact 10 of relay FL(5), in parallel through resistance D(5) and the winding of relay B(5) and over contact 3 of relay B(5) and resistance B(5) to battery, thereby identifying the trunk of Figs. 4 and 5 to the concentrating circuits. Relay ST(6) when operated as above described, connects ground from contact 8 of relay CO(6), over contact 1 of relay ST(6) and conductor 705 to the heater element of thermal relay TM(7) to start a timing operation. At contact 3 it connects brush TK1(6), over conductor 706, contact 2 of relay E(7) and conductor 709 to the winding of polarized relay P(6) and at contact 4 connects ground to the winding of slow-to-operate relay SO(6). The other terminals of the windings of relays P(6) and SO(6) are connected in parallel to battery over the back contact and through the winding of the stepping magnet STP(6) of switch TK(6).

Switch TK(6) remains in the position last used and the further functioning of the circuit depends upon the condition of the terminal on which brush TK1(6) is resting. This terminal may be grounded by another concentrating circuit or another trunk as described hereinafter, it may be marked by battery from a trunk as above traced, or it may be disconnected.

If that terminal is grounded, magnet STP(6) is energized through the winding of relay P(6) but the direction of current flow is such that relay P(6) is not operated. When magnet STP(6) operates, it opens its operating circuit at its own back contact and advances the switch TK(6) to the next terminal.

If, due to a trouble condition, the terminal is disconnected, relay SO(6) will operate after an interval measured by its slow-to-operate adjustment, but magnet STP(6) does not receive sufficient current to permit it to operate. Relay SO(6) closes a substitute circuit from battery through the winding of magnet STP(6), contact of relay SA(6), contact 2 of relay P(6), contact 5 of relay ST(6) to ground, operating magnet STP(6) which opens the operating circuit for relay SO(6), which releases, in turn releasing magnet STP(6) to advance switch TK(6) to its next set of terminals.

If brush TK1(6) is, as shown, resting on a terminal to which battery has been connected by a trunk, relay P(6) operates in series with relay SO(6), which operates in turn but more slowly. Relay P(6) opens the operating circuit for magnet STP(6) and closes a circuit over its contact 1 and conductor 707 through the winding of relay E(7) which operates.

Relay E(7) at contact 5 closes an operating circuit over conductor 708 for relay CO(6). At contact 1 it connects battery through resistance D(7) and over conductor 709 to the winding of relay P(6) to hold that relay operated under the control of relay ST(6) and at contact 2 disconnects brush TK1(6) from relay P(6).

Relay CO(6), at contact 8, opens the circuit of thermal relay TM(7) to terminate its timing operation. At contact 6, relay CO(6) closes a circuit from ground to conductor 600, contact 5 of relay AN(7), conductor 700, contact 5 of relay SD(9), conductor 900, winding of relay DS(7) and battery.

Relay DS(7) operates in this circuit and at contact 1 connects ground over contact 3 of relay E(7) conductor 706 and contact 3 of relay ST(6) to brush TK1(6), and over conductor 509 as above-traced to the winding of relay B(5) in the trunk circuit, operating relay B(5), which locks to ground on conductor 507 and disconnects battery from start conductor 508.

Relay DS(7) connects ground through resistance E(7) and the high resistance upper winding of relay S(7), contact 2 of relay DS(7), conductor 710, contact 4 of relay CO(6), brush TK3(6), conductor 601, winding of relay AN(4), conductor 410, contact 7 of relay S2(5), contact 2 of relay FL(5), contact 2 of relay MA(5) to battery through resistance AN(5). Relay S(7) operates in this circuit closing a locking circuit for relay E(7) but marginal relay AN(4) does not operate.

At contact 3 relay DS(7) closes a circuit for relay BY(7). Relay BY(7) operates further opening the start circuit leading to relay ST(6) and extending start conductor 508 to the second concentrating circuit represented by relays AL2 and BY2.

Relay ST(6) releases, following the operation of relays B(5) and BY(7), and opens the circuit of relays P(6) and SO(6) permitting these relays to release.

When relay CO(6) operates, as above described with the brushes to switch TK(6) engaging terminals connected with the trunk of Figs. 4 and 5, it extends the class of line conductor 407, over brush TK2(6), contact 5 of relay CO(6), conductor 602, to the windings of relays NC(9), CN(9), PB(9) and ground over contact 5 of relay PB(9). Relay NC(9) operates in this circuit, but polarized relay CN(9) and marginal relay PB(9) do not.

With relay NC(9) operated alone, a signal characteristic of the class of the calling line is transmitted over the interoffice trunk to the switchboard at the attended office. The circuit for transmitting this signal may be traced from negative 130-volt battery through resistance lamp NP(9), contact 4 of relay NC(9), normally closed contact 2 of relay CN(9), conductor 902, contact 9 of relay CO(6), conductor 603, contact 1 of relay NC(9), contact 7 of relay PB(9), contact 4 of relay HC(9), contact 4 of relay SD(9), conductor 903, through resistance R1(10), upper windings of relays D(10) and C(10), lower right winding of repeating coil T(10), ring conductor 1000 of the interoffice trunk, lower left winding of repeating coil T(11) in the permanent signal trunk at the attended office, upper windings of relays CN(11) and NC(11), resistance R4(11), contact 2 of relay RG1(11), contact 1 of relay R1(11) conductor 1100, contact 8 of relay H3(12), contact 4 of relay SL1(12) to ground.

A full duplex method of signaling is used to transmit signals between the concentrating circuit and the switchboard, thereby permitting the sending of a positive or negative signal by either circuit at the same time that it is receiving a positive or a negative signal on either or both tip and ring conductors, providing means for transmitting as many as eight different signals in either direction.

The signaling relays A(10), B(10), C(10) and D(10) are three-winding polar relays with each winding having the same number of turns, relays A(10) and B(10) connected to the tip conductor of the trunk and relays C(10) and D(10) to the ring conductor. The lower windings of the relays are used to bias the relays so that their armatures will normally rest against a back contact. The signaling current flows through the upper windings, while the balancing net current flows through the middle windings. The values of resistances R3(10) and T3(10) are selected to equal the line conductor resistance to the other office. With this arrangement, any potential applied at the sending end, with ground applied at the receiving end, will cause equal currents to flow through the middle and upper windings of the sending end relays. These relays are so connected that the currents in this case will cause opposite magnetic effects and thus cancel each other so that there will be no tendency for the sending end relays to operate. At the receiving end the middle windings, having ground connected to both sides, are not energized and the current flow through the upper windings is of sufficient magnitude to overcome the bias.

If the same polarity and magnitude of potential is applied at both ends of a signaling circuit, the current in the upper windings of both the sending and the receiving relays will be zero. In this case the middle windings become effective and at each end, the relay whose middle winding is poled to agree with the applied potential will operate.

If potentials of opposite polarities are applied at the two ends of a signaling circuit, current in that circuit will be of large magnitude. This large current in the upper windings will overcome the smaller current through the middle winding and cause the relays, whose upper windings are correctly poled, to operate.

Consequently whenever a positive potential is applied to the tip conductor at the switchboard, relay A(10) will operate; whenever a positive potential is applied to the ring conductor, relay C(10) will operate; whenever a negative potential is applied to the tip conductor, relay B(10) will operate and whenever a negative potential is applied to the ring conductor, relay D(10) will operate.

At the switchboard end of the trunk, relays H(11), PB(11), NC(11) and CN(11) correspond to relays A(10), B(10), C(10) and D(10) respectively, relays H(11) and PB(11) being connected to the tip conductor and relays NC(11) and CN(11) being connected to the ring conductor. Relays H(11) and CN(11) are responsive to positive potential applied at the concentrating circuit while relays PB(11) and NC(11) respond to a negative potential.

Therefore the connection of negative battery to the signaling circuit extending over the ring conductor as previously traced results in the operation of relay NC(11). Relay NC(11) operated, connects ground to conductor 1106, in turn operating relay NC1(12). Relay NC1(12) at contact 1 closes a circuit from battery over the contact of interrupter 1200, contact 7 of relay SL1(12), contact 1 of relay H1(12), contact 1 of relay NC1(12), conductor 1201 through lamp NC(11) to ground. Lamp NC(11) flashes under the control of the interrupter.

When the operator observes the flashing of lamp NC(11) she will insert the answering plug 1300 of one of her switchboard cords in the jack ANS-NC(11) associated with the flashing lamp. The insertion of this plug completes a circuit from battery through resistance A(13) and lamp RL, normal contact 6 of relay TK(13), sleeves of plug 1300 and jack ANS-NC(11), lower winding of relay SL(11) to ground operating relay SL(11). Relay SL(11) in turn over conductor 1107 operates relay SL1(12). Relay SL1(12) at contact 7 disconnects lamp NC(11) from battery over interrupter 1200 and at contact 6 connects it directly to battery causing lamp NC(11) to stop flashing and light steadily.

At contact 4 relay SL1(12) disconnects ground from the ring signaling circuit and at contacts 3 and 2 extends that circuit to 130-volt positive potential through resistance lamp B(12) as an operator answer signal. This positive potential causes relay C(10) in the concentrating circuit to operate, in turn over conductor 1004 operating relay CA(9). Relay CA(9) operates relay C1(9), which closes a circuit from battery through the winding of relay AN(7), conductor 701, contact 3 of relay C1(9), conductor 906, to ground at contact 3 of relay LD(10). Relay AN(7) operates in this circuit, locking over its contact 3 and conductor 702 to ground at contact 7 of relay CO(6). At contact 5 relay AN(7) opens the previously traced operating circuit for relay DS(7) and at contact 4 closes a substitute circuit for relay DS(7) over conductor 703 to ground at contact 3 of relay CA(9) and contact 7 of relay C1(9). At contact 2, relay AN(7) closes an auxiliary circuit for relay BY(7) and at contact 1 connects ground through the low resistance lower winding of relay S(7) in parallel with the high resistance winding of that relay, increasing the current flow through the winding of relay AN(4) sufficiently to cause the latter relay to operate.

Relay AN(4) at contact 8 closes a supplementary ground to conductor 516 to hold relay S2(5) operated, disconnects tone through coil TN(4) from the ring conductor, opens the previously traced operating circuit for relay S(4), and opens the operating circuit for relay CO(4) to prevent the test desk from connecting with the subscriber's line and releasing the concentrating circuit while the operator is connected therewith.

With relay AN(4) operated, the tip and ring conductors 405 and 406 which are joined by the permanent signal condition, are extended over contacts 1 and 6 of relay CO(4), contacts 3 and 4 of relay AN(4), conductors 517 and 518, brushes TK5(6) and TK4(6), contacts 2 and 3 of relay CO(6), contacts 2 and 5 of relay HL(6), conductors 605 and 606, contacts 1 and 6 of relay R(8) and conductors 817 and 818 to the left windings of repeating coil T(10), whence the tip conductor extends over contact 1 of relay CB(10) and conductor 1001 to ground at contact 2 of relay D1(9) and the ring conductor extends over contact 6 of relay CB(10), conductor 1005, contact 3 of relay R(8), conductor 607, contact 1 of relay CO(6), brush TK6(6), conductor 519, contact 1 of relay AN(4) to battery through the winding of relay S(4) and resistance lamp A(4). Relay S(4) is therefore held operated, in turn holding relays S1(4) and S2(5) operated.

The right windings of repeating coil T(10) are connected over conductor 1000 and 1006 with the left windings of repeating coil T(11) while the right windings of coil T(11) are included in a circuit which may be traced from ground through the winding of relay R1(11), contact 3 of relay SL3(11), upper right winding of coil T(11), contact 1 of relay SL3(11), tip contacts of jack ANS-NC(11) and plug 1300 to contact 1 of relay TK(13), and from ground through resistance E(12), windings of polar relay C(12), conductor 1206, contact 8 of relay SL3(11), lower right winding of coil T(11), contact 10 of relay SL3(11), ring contacts of jack ANS-NC(11) and plug 1300 to contact 12 of relay TK(13).

The operator then operates the TALK key (13) of the cord, which operates relay TK(13) over a circuit including other talking keys of her position. Relay TK(13) locks over the Talk key (13) and its contact 4 and extends the tip and ring conductors of the cord to the operator's circuit, permitting her to challenge on the calling line.

If the operator receives no reply she attempts to clear the trouble. Her first attempt would be to attract the subscriber's attention by ringing on the line. To do this she operates the ring-rear key completing a circuit from battery at contact 1 of relay RB(13), contact 9 and winding of relay R(13), contact of the ring-rear key, winding of relay RR(13) to ground. Relays R(13) and RR(13) operate, relay R(13) locking to battery over its contact 8. With relays R(13) and RR(13) operated, a circuit is closed from ground over contact 10 of relay R(13), contact 3 of relay RR(13), to the winding of relay RB(13) and battery. Relay RB(13) operates and locks to contact 10 of relay R(13) independent of relay RR(13). With relay RB(13) operated, battery is connected through resistance J(13), contact 5 of relay CR(13), contact 5 of relay CC(13), contact 5 of relay RB(13), contact 5 of relay RR(13), contact 2 of relay R(13), tip contact of plug 1300 and jack ANS-NC(11), contact 1 of relay SL3(11), upper right winding of repeating coil T(11), contact 3 of relay SL3(11) to ground through the winding of relay R1(11).

Relay R1(11) operates, and at contact 1 disconnects battery from the ring signaling circuit and at contact 2 connects ground thereto, thereby releasing relays C(10), CA(9) and C1(9). At contact 4 relay R1 disconnects ground and at contact 3 connects negative 130-volt battery supplied over contact 1 of relay SL1(12) and conductor 1104 to the tip signaling circuit. Since ground is connected to this circuit at the concentrating circuit over contact 2 of relay PB(9), contact 1 of relay HC(9), contact 1 of relay SD(9) and conductor 904, relay B(10) operates at the concentrating circuit, in turn closing a circuit from ground at the contact of relay B(10), conductor 1002, contact 4 of relay A1(9) to the winding of relay B1(9) and battery.

Relay B1(9), at contact 7 grounds conductor 703 to hold relay DS(7) operated, and at contact 2 closes a circuit from battery through the winding of relay R(8), conductor 800, contact 2 of relay B1(9), contact 2 of relay A1(9), contact 2 of relay C1(9), conductor 906, to ground at contact 3 of relay LD(10). Relay R(8) operates in this circuit, disconnecting the tip and ring conductors of the line from repeating coil T(10) and connecting these conductors over conductors 801 and 802 to the ringing supply 910. Relay R(8) also opens the circuit of relay S(4) causing that relay to release and in turn release relay S1(4) to remove the class of line signal. However, relay S2(5) is held operated by relay AN(4). Audible ringing current is sent back to the switchboard through condensers T1(8) and R1(8) as an indication that ringing current is being applied to the subscriber's line.

When the ring-back key is restored to normal, relays R(13), RR(13) and RB(13) release, in turn releasing relay R1(11). With relay R1(11) released, ground is removed from and positive battery reconnected to the ring signaling circuit, while the negative battery is removed from and ground reconnected to the tip signaling circuit. Relays C(10), CA(9) and C1(9) reoperate and relays B(10), B1(9) and R(8) release. With relay R(8) released the circuit of relay S(4) is reclosed and that relay reoperates if the permanent signal condition still exists, in turn operating relay S1(4) which again transmits the class of line signal to the switchboard as an indication that the trouble has not been removed.

Figure 14:
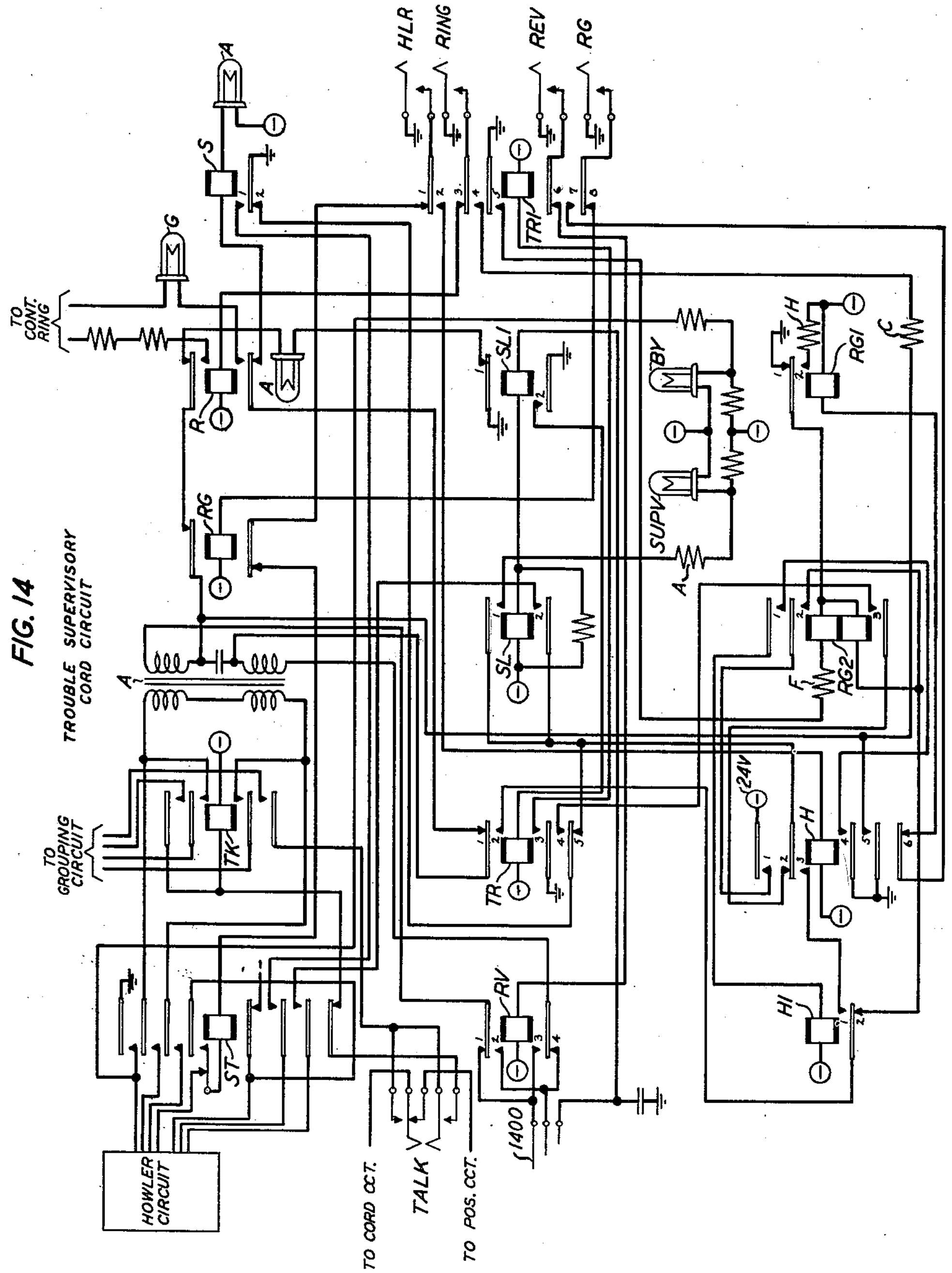
Fig. 14 shows a trouble supervisory cord circuit.

In order to make further attempts to clear the permanent signal condition, the operator now employs the trouble supervisory cord circuit of Fig. 14, inserting plug 1400 in the test jack TST–NC corresponding to jack ANS–NC(11). Battery connected to the sleeve of plug 1400 through the windings of relays SL(14) and SL1(14) completes a circuit over the sleeve of jack TST–NC through the windings of relay SL2(11) in parallel to ground.

The cord circuit of Fig. 14 is arranged to be used, not only with trunks incoming from a concentrating circuit as shown in the present disclosure, but also with direct trunks from other types of offices such as offices employing panel type switches. To distinguish between the type of trunk shown and trunks from panel switch offices, and to modify the cord circuit to function in the two cases, marginal relay SL1(14) operates in connection with the low resistance parallel connection of the windings of relay SL2(11) but does not operate in series with the high resistance supplied by panel type trunks.

Therefore both relay SL(14) and relay SL1(14) operate, relay SL(14) closing a circuit from ground at contact 2 of relay S(14), contact 5 of relay TR(14), contact 1 of relay SL(14) through resistance A(14) to lamp SUPV(14) and battery, lighting that lamp. Relay SL1(14) at contact 1 disconnects ground from the tip contact of plug 1400, and at contact 2 operates relay TR(14). Relay TR(14) opens the circuit of lamp SUPV, extinguishing that lamp. Relay TR(14) at contact 3 closes a circuit for relay TR1(14), which also operates, and at contact 2 connects the ring contact of plug 1400, over contact 4 of relay RV(14), lower right winding of repeating coil A(14), contact 2 of relay TR(14), contact 2 of relay H1(14), lower winding of relay RG2(14) to ground at contact 1 of relay RG1(14).

Figure 13:
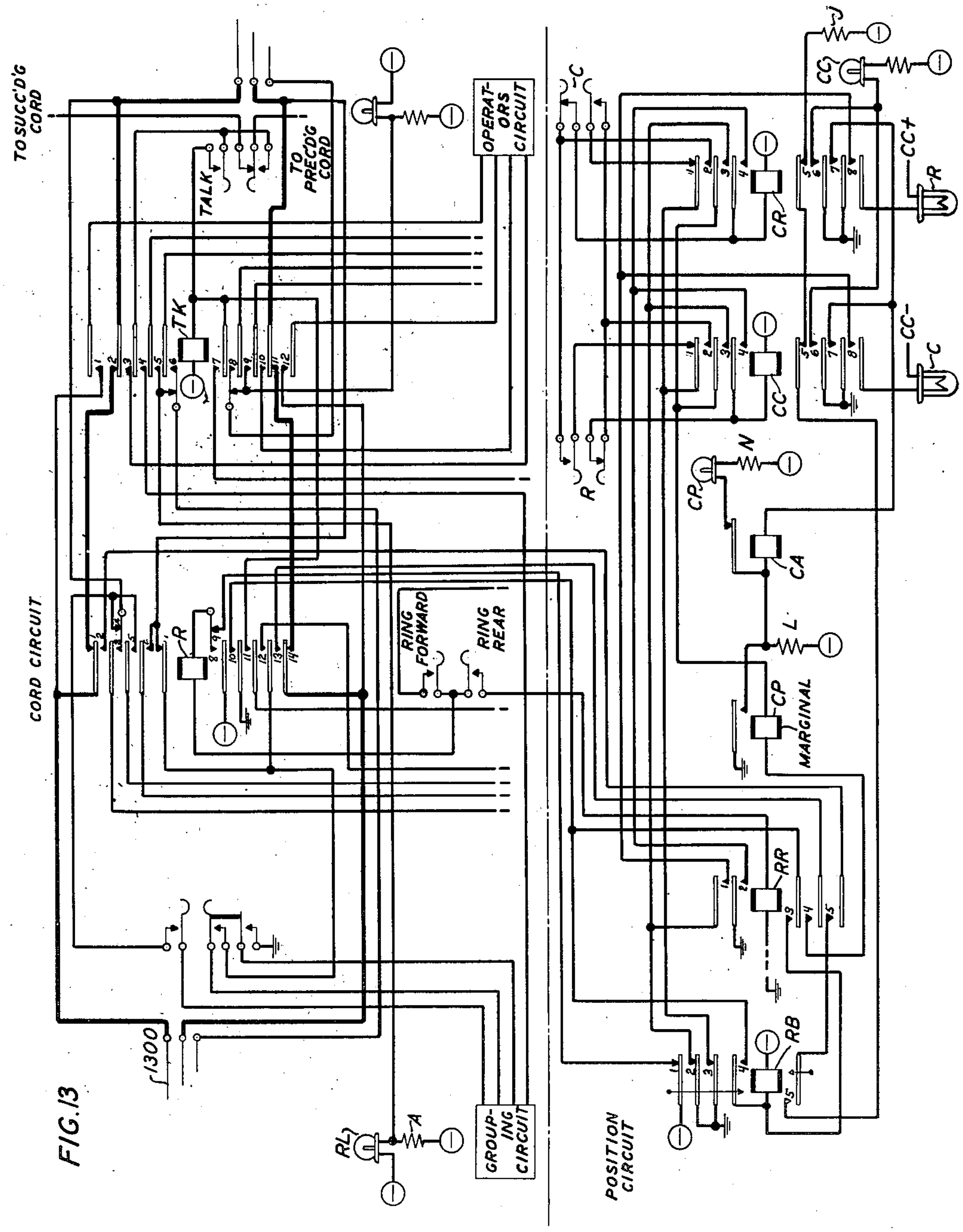
Fig. 13 shows an operator's cord circuit and a portion of the operator's position circuit.

In the trunk circuit relay SL2(11) operates, connecting ground to the upper winding of relay SL(11), reducing the resistance connected to the sleeve of jack ANS–NC(11) to light lamp RL(13) in the cord circuit of Fig. 13 as soon as relay TK(13) is restored. At contact 2, relay SL2(11) connects ground to the upper winding of relay RG(11) and at contact 1 closes a circuit for relay SL3(11) which operates. Relay SL3(11) transfers the tip and ring conductors from jack ANS–NC(11) to jack TST–NC(11).

The operator will restore the Talk key of the cord of Fig. 13 and operate the Talk key of the cord of Fig. 14, operating relay TK(14) to connect her headset with repeating coil A(14). She may also ring from this cord by operating the ring key, thereby connecting ground over contact 4 of relay TR1(14), resistance C(14), upper right winding of repeating coil A(14), contact 1 of relay RV(14), tip contacts of plug 1400 and jack TST–NC(11), contact 2 of relay SL3(11), upper right winding of repeating coil T(11), contact 4 of relay SL3(11), conductor 1101, windings of relays H2(12) and R(12) to battery. Relay R(12) operates, but relay H2(12) which is marginal, does not operate. Relay R(12) connects battery over its contact, contact 3 of relay H2(12), conductor 1202 to the winding of relay R1(11) which operates to cause the application of ringing current to the attached line as above described. When the ring key of this cord is restored, relays R(12) and R1(11) release.

The operator may then test to determine whether there is a false ground on the subscriber's line. To do this, key RG(14) is operated, completing a circuit from ground at the contact of key RG(14) over contact 7 of relay TR1(14), contact 6 of relay H(14), to the winding of relay RG1(14) and battery. Relay RG(14) operates, connecting battery through resistance H(14) to the windings of relay RG2(14). The upper winding of relay RG2(14) is connected to ground through resistance F(14) and contact 5 of relay TR1(14). The lower winding of relay RG2(14) is connected over contact 2 of relay H1(12), contact 2 of relay TR(14), lower right winding of repeating coil A(14), contact 4 of relay RV(14), ring contacts of plug 1400 and jack TST–NC(11), contact 9 of relay SL3(11), lower right winding of repeating coil T(11), contact 7 of relay SL3(11), conductor 1102, contact 1 of relay S1(12), contact 3 of relay H3(12), conductor 1203, lower winding of relay RG(11), conductor 1103, contact 9 of relay H3(12) to ground at contact 3 of relay S(12). Relay RG(11) operates in this circuit, in turn operating relay RG1(11). The windings of relay RG2(14) are connected in opposition so that when the above-traced circuits are closed, the currents in the two windings are essentially balanced and opposed and that relay does not operate.

Relay RG1(11) disconnects the positive potential previously supplied to the ring signaling circuit and extends that circuit over contact 1 of relay RG1(11), contact 5 of relay SL3(11), conductor 1104, contact 1 of relay SL1(12) to 130-volt negative potential. At the concentrating circuit, this action results in the release of relay C(10) and the operation of relay D(10). The release of relay C(10) releases relay CA(9) and relay C1(9) as previously described. The operation of relay D(10) closes a circuit from ground over the contact of relay D(10), conductor 905, contact 6 of relay C1(9), to the winding of relay D1(9) and battery. Relay D1(9) operates in this circuit, closing ground over its contact 6 to conductor 703 to hold relay DS(7) operated. At contact 2, relay D1(9) disconnects ground from conductor 1001 and at contact 3 connects ground to conductor 702 to hold relay AN(7) operated.

The removal of ground from conductor 1001 opens the loop circuit over the attached subscriber's line. If the line is not grounded, relay S(4) will release, releasing relay S1(4), removing the class of line signal and extinguishing lamp NC(11). If the permanent signal condition is caused by a ground on the subscriber's line, relay S(4) will be held operated, and lamp NC(11) will remain lighted as an indication of that fact. The operator may also operate keys RG(14) and Ring(14) at the same time to apply ringing to one side of the line only.

If there is no ground on the line and the subscriber does not respond to a ringing signal, the operator may try to attract his attention by applying howler tone to the line, assuming that the receiver has been left off the switchhook. For this purpose the operator will restore the Talk(14) key and operate key HLR(14) associated with the cord of Fig. 14. With key HLR(14) operated, ground is connected over the contact of key HLR(14), contact 2 of relay TR1(14), winding of relay H(14) to battery. Relay H(14) at contact 5 connects ground to the upper winding of repeating coil A, contact 1 of relay RV(14), tip contacts of plug 1400 and jack TST-NC(11) and thence over the circuit as previously traced to battery through the windings of relays H2(12) and R(12). Since resistance C(14) is not included in the present circuit, both relay H2(12) and relay R(12) operate. Relay R(12) closes the circuit for relay R1(11) as previously described, but, since relay R1(11) is slow to operate, relay H2(12) at contact 3 opens the circuit of relay R1(11) before that relay becomes sufficiently energized to operate its contacts.

Relay H2(12) at contact 2 closes a circuit from battery at the contact of relay R(12) to ground through the winding of relay H3(12), operating the latter relay. Relay H3(12) transmits an "apply howler" signal to the concentrating circuit at the cross bar office. To do this, at contact 5 it disconnects ground from the tip signaling circuit and at contact 6 extends that circuit over contact 5 of relay PB1(12), conductor 1204, contact 6 of relay SL3(11), conductor 1105, contact 2 of relay SL1(12) to positive 130-volt potential. At contact 8 relay H3(12) disconnects positive 130-volt potential from the ring signaling circuit and at contact 7 extends that circuit over contact 7 of relay PB1(12), conductor 1205, contact 5 of relay SL3(11), conductor 1104, contact 1 of relay SL1(12) to negative 130-volt potential. Relay H3(12) also, at contact 3, opens the circuit of relay RG(11) and at contact 4 closes a circuit from 24-volt battery over contact 2 of relay S2(12), to contact 1 of relay S1(12), and thence over conductor 1102, contact 7 of relay SL3(11), lower right winding of repeating coil T(11), contact 9 of relay SL3(11), ring contacts of jack TST-NC(11) and plug 1400, contact 4 of relay RV(14), lower right winding of repeating coil A, contact 2 of relay TR(14), contact 2 of relay H1(14), lower winding of relay RG2(14) to ground at contact 1 of relay RG1(14). At this time the upper winding of relay RG2(14) is connected between ground at contact 1 of relay RG1(14) and ground at contact 5 of relay TR1(14) and is therefore not energized. Relay RG2(14) therefore operates in response to the connection of 24-volt battery to its lower winding. Relay RG2(14) closes a locking circuit for itself from ground at contact 1 of relay RG1(14), lower winding of relay RG2(14), contact 2 of relay RG2(14), contact 1 of relay H(14) to 24-volt battery. Relay RG2(14) closes a circuit from battery through the winding of relay H1(14), contact 1 of relay RG2(14), contact 4 of relay H(14) to ground. Relay H1(14) operates in this circuit, opening the operating circuit of relay RG2(14) and extending the 24-volt battery over its contact 1, contact 3 of relay H(14), contact 1 of relay SL(14), resistance A(14) to lamp SUPV(14) which is also connected to 24-volt battery so that lamp SUPV(14) is not lighted.

In the concentrating circuit, relays A(10) and D(10) operate in response to the "apply howler" signal. Relay A(10) closes a circuit from ground over its contact, conductor 1003, contact 4 of relay B1(9) to battery through the winding of relay A1(9), which operates. Relay D(10) operates relay D1(9) over the circuit previously traced. With relays D1(9) and A1(9) operated, a circuit is closed from battery through the winding of relay HL(6), conductor 604, contact 1 of relay PB(9), contact 5 of relay D1(9), contact 3 of relay B1(9), contact 3 of relay A1(9), contact 2 of relay C1(9), conductor 906 to ground at contact 3 of relay LD(10).

Relay HL(6) disconnects the tip and ring of the attached line from repeating coil T(10) and extends them over conductors 608 and 609 through the left windings of repeating coil HL(8) to ground and through the winding of relay L(8) to battery through resistance lamp C(8), respectively. Assuming that the permanent signal condition still exists, relay L(8) operates, in turn operating relay L1(8). With relays L1(8) and HL(6) operated, a circuit is prepared for relay H(8) extending from battery through the winding of that relay, contact 3 of relay H1(8), contact 2 of relay L1(8), conductor 819, contact 8 of relay HL(6), to conductor 811 leading to the howler circuit 810. When the howler circuit 810 is idle, ground is connected to conductor 811, permitting relay H(8) to operate. At contact 2, relay H(8) extends its operating ground to battery through the lower winding of relay H1(8) which also operates. At contact 3, relay H(8) closes a holding circuit for itself and relay H1(8) over contact 1 of relay L(8), conductor 820, contact 9 of relay HL(6) to conductor 812, which is grounded by the howler circuit 810 at this time. Relay H1(8) closes a locking circuit for itself from battery through its upper winding and contact 2 and conductor 821 to ground at contact 6 of relay HL(6). With both relay H(8) and relay H1(8) operated, the right windings of repeating coil HL(8) are connected to conductors 813 and 814 leading to the howler circuit 810 in preparation for transmitting the howler tone to the subscriber's line.

When relay HL(6) operated it opened the class of line signaling circuit thereby releasing relay NC(9). Relay NC(9) disconnects negative 130-volt battery from the ring signaling circuit and connects ground thereto, thereby releasing relay NC(11) at the switchboard end of the trunk, in turn releasing relay NC1(12) and extinguishing lamp NC(11).

With relays H1(8) and H(8) operated, a circuit is closed from conductor 815, contact 5 of relay H(8), contact 5 of relay H1(8), to conductor 816 to cause the howler circuit to start to function. Relay H1(8) at contact 3 disconnects relay H(8) from conductor 811, but relay H(8) remains operated over conductor 812 until the howler circuit 810 has completed its cycle. In addition relays H1(8) and H(8) complete a circuit from ground at contact 6 of relay H1(8), contact 6 of relay H(8), conductor 907 to the winding of relay HC(9) and battery.

Relay HC(9) at contact 1 disconnects ground from the tip signaling circuit and extends that circuit over its contact 2, conductor 911, contact 6 of relay E(7), conductor 912 to positive battery through resistance lamp CN(9). At contact 4 relay HC(9) disconnects the ring signaling circuit from negative battery supplied by relay NC(9) and connects that circuit to ground as a signal that the howler tone has been connected to the subscriber's line. At the switchboard end of the trunk this signal causes relay H(11) to operate, in turn, over conductor 1108, operating relay H1(12). With relay H1(12) operated and relay NC1(12) released, a circuit is closed from ground over contact 3 of relay H1(12), contact 5 of relay NC1(12), contact 2 of relay H3(12) to battery through the winding of relay S1(12). Relay S1(12) disconnects 24-volt battery from the circuit previously traced for lamp SUPV(14) and connects ground over interrupter 1206 to that circuit causing lamp SUPV(14) to flash as an indication to the operator that howler tone is being applied.

After a period of about 40 seconds, the howler circuit 810 completes its cycle and momentarily removes ground from conductor 812, releasing relay H(8). Relay H1(8) remains operated under the control of relay HL(6). The release of relay H(8) disconnects repeating coil HL(8) from the howler circuit and disconnects conductor 815 from conductor 816 to permit the howler circuit 810 to return to normal. In addition, it opens the circuit of relay HC(9), which, at contact 2 removes positive battery from the tip signaling circuit and replaces it with ground over its contact 1 and contact 2 of relay PB(9). At contact 3 it disconnects ground from the ring signaling circuit but ground is reconnected to that circuit over contact 4 of relay HC(9), contact 7 of relay PB(9) and contact 2 of relay NC(9).

The substitution of ground for positive battery on the tip signaling circuit releases relay H(11), in turn releasing relays H1(12) and S1(12) to extinguish lamp SUPV(14).

When the operator restores the howler key HLR(14), relay H(14) releases, in turn releasing relays H1(14) and RG2(14). Relay H(14) opens the circuit of relays H2(12) and R(12) in the trunk circuit and these relays release in turn releasing relay H3(12). Relay H3(12) released, disconnects negative battery from the ring signaling circuit and again connects positive battery to that circuit. It also disconnects positive battery from the tip signaling circuit and extends that circuit to ground.

In response to these signals, relay D(10) releases and relay C(10) operates in the ring signaling circuit while relay A(10), which was operated over the tip signaling circuit, releases. Relays D1(9) and A1(9) release while relays CA(9) and C1(9) reoperate. The release of relays A1(9) and D1(9) in turn releases relays HL(6), H1(8), L(8) and L1(8). Relay CA(9) in reoperating holds relay AN(7) operated. With relay HL(6) released the continued presence of the permanent signal condition will reoperate relay S(4) and again cause lamp NC(11) to light.

Having failed to remove the permanent signal condition, the operator will inform the maintenance force of the identity of the office at which the line is located and will restore any operated keys and remove both cord circuits. Removal of plug 1300 from jack ANS-NC(11) releases relays SL(11) and SL1(12). Removal of plug 1400 from jack TST-NC(11) releases relays SL2(11) and SL3(11). With relay SL1(12) released, ground is substituted for positive battery on the ring signaling circuit, resulting in the release of relays C(10), CA(9) and C1(9). With relays CA(9) and C1(9) released and none of the relays A1(9), B1(9) or D1(9) operated, ground is removed from conductor 703 and relay DS(7) releases, in turn releasing relay S(7). Relay S(7) opens the locking circuit for relay E(7) and that relay also releases, in turn releasing relay CO(6), followed by relay AN(7) and relay BY(7), thus restoring the concentrating circuit to normal.

When relay DS(7) opens the circuit of relay S(7) it also opens the circuit of relay AN(4) in the permanent signal holding trunk. With relay AN(4) released, the tip and ring conductors of the subscriber's line are again connected to ground through resistance P(4) and battery through relay S(4). Relay S(4) operated, holds relays S1(4) and S2(5) operated and, with relay AN(4) released, again connects the high tone to the ring conductor. Relay B(5) remains locked under the control of relay S2(5) to prevent reclosure of the start circuit for the concentrating circuits.

During the foregoing operations, the timing circuit 504 has been operating to measure off a time interval sufficient for the operator to make the above-described attempts to clear the condition. When the timing circuit 504 has started to function it connects battery to conductor 510, operating relay LO(5) which locks to battery at its contact 1 under the control of relay S2(5). At the termination of the predetermined time, the timing circuit 504 connects battery to conductor 511, completing a circuit over contact 3 of relay LO(5) to the winding of relay FL(5) and ground. Relay FL(5) locks over its contact 6 to battery at contact 1 of relay LO(5).

Relay FL(5) disconnects battery from relay AN(4) thereby releasing relay AN(4) and the concentrating circuit and extinguishing the class of line signal at the attended office if the operator has not already released. At contact 7 relay FL(5) connects ground over contact 5 of relay MA(5) to the armature of interrupter 513 and at contacts 3 and 4 transfers the circuit of lamp NC(2) from steady ground to the contact of interrupter 513 so that lamp NC(2) now flashes. At contact 5, relay FL(5) opens the start circuit of timing circuit 504 stopping the timing operation, at contact 8 further opens the start circuit for the concentrating circuit and at contact 9 connects ground to conductor 509 to assist a concentrating circuit in passing over the corresponding terminal. Relay FL(5) also operates a minor alarm.

The trunk remains in this condition until the permanent signal condition is removed or connection is made therewith for further test. If a maintenance man happens to be working at the cross bar office he may insert the plug of a test cord in the associated jack 200 identified by the flashing lamp NC(2) at the test desk. Battery on the sleeve of the cord completes a circuit over the sleeve of jack 200, sleeve conductor 201, contact 7 of relay AN(4) to the winding of relay CO(4) and ground. Relay CO(4) connects conductors 405 and 406, to which the subscriber's line has been connected, over its contacts 2 and 5 to conductors 202 and 203 extending to jack 200, providing a circuit free of any central office equipment so that additional tests may be made to determine the cause of the trouble. Relay CO(4) at contact 4 closes a holding circuit for relay S1(4) over conductor 411 under the control of relay S2(5) which is held operated by relay S1(4). At contact 3, relay CO(4) closes a circuit over conductor 412 for operating relay MA(5), which operates and locks under the control of relay S2(5), transfers the circuit of lamp NC(2) to interrupter 512, so that the lamp continues to flash but at a slower rate, and opens the alarm circuit.

Figure 2A:
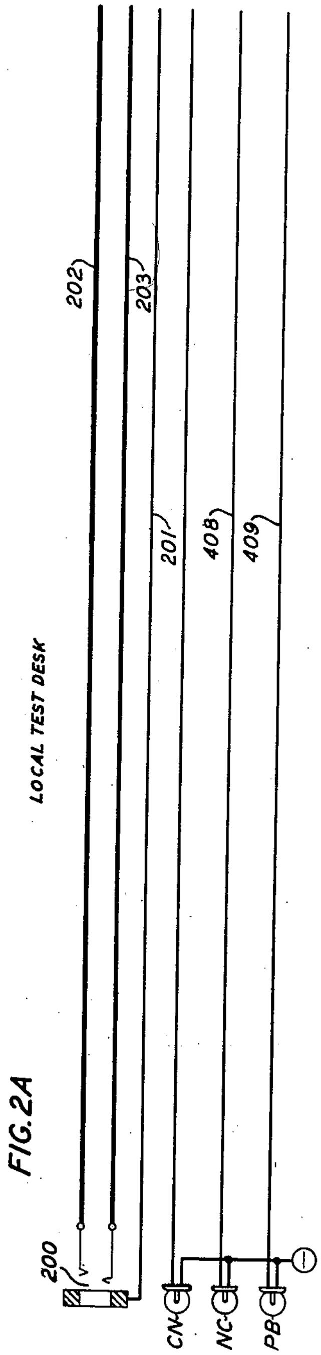
Fig. 2A shows a jack and a set of lamps associated with the trunk circuit of Figs. 4 and 5.
Figure 2B:
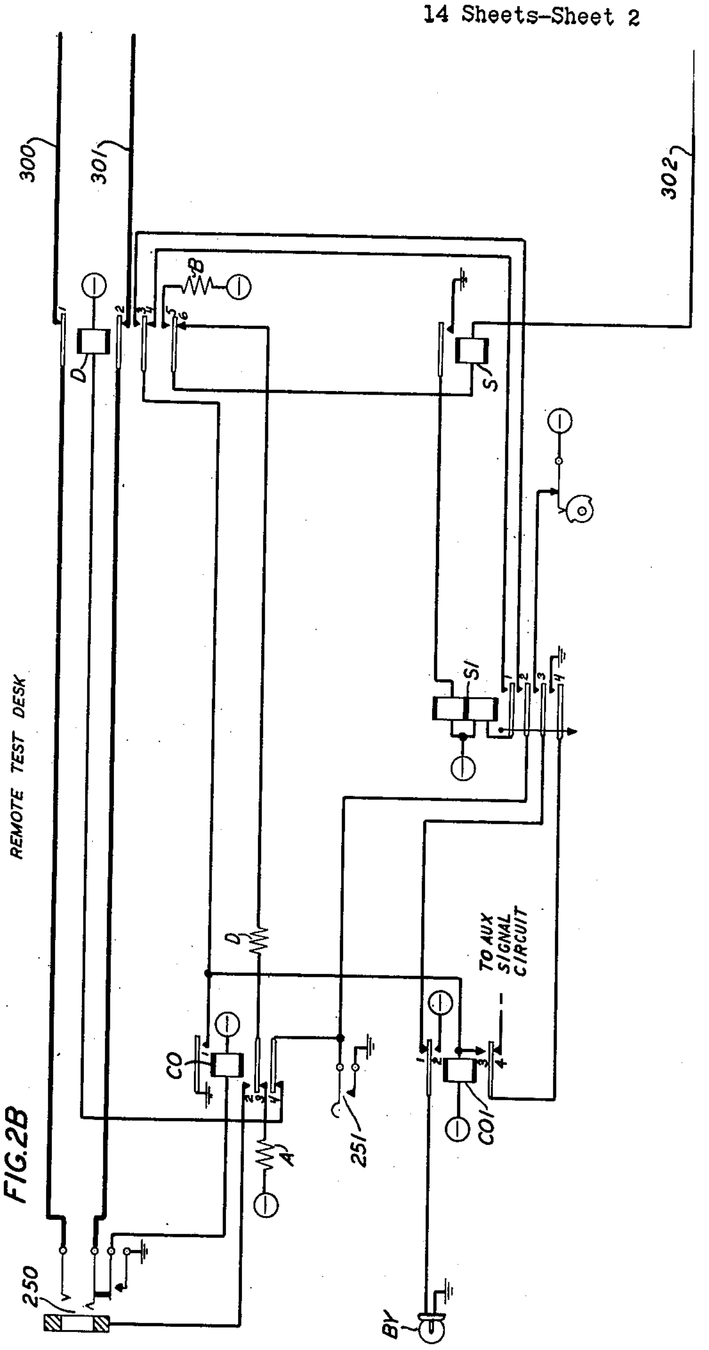
Fig. 2B shows a trunk circuit at a remote test desk having access to the selector of Fig. 3.
Figure 3:
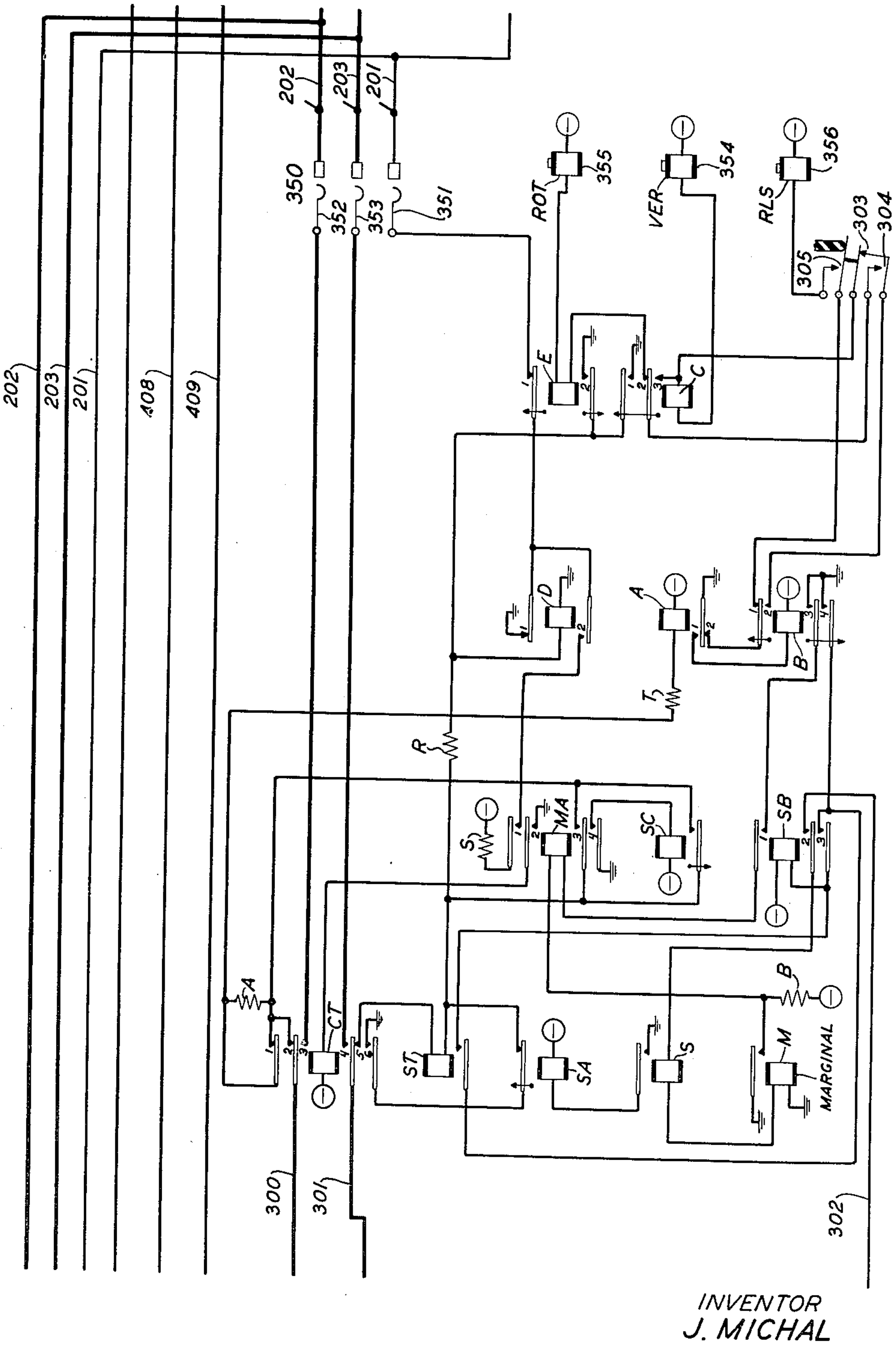
Fig. 3 shows a test selector circuit which may be used to obtain access to the trunk circuit of Figs. 4 and 5.

Connection may also be made with the permanent signal holding trunk by means of the test trunk circuit of Fig. 2B which terminates in the test selector of Fig. 3. When the plug of a test cord is inserted in jack 250, the circuit of relay CO(2) is closed at the auxiliary contact of jack 250. Relay CO(2) at contact 1 closes a circuit in which relay CO1(2) operates.

The maintenance man now operates the dial key in the test cord, completing a circuit from battery through the winding of relay A(3), resistance T(3), contacts 1 and 2 of relay CT(3), tip conductor 300, contact 1 of relay D(2), tip contact of jack 250, over the tip conductor and through the dial back to the ring conductor of the test cord, ring contact of jack 250, contact 2 of relay D(2), ring conductor 301, contact 5 of relay CT(3), winding of relay ST(3), resistance R(3) to ground through the winding of relay D(3). Relays ST(3), A(3) and D(3) operate in this circuit, relay A(3) operating relay B(3). Relay B(3) closes a circuit from ground at its contact 4, contact of relay ST(3), winding of relay SB(3) to battery. Relay SB(3) operates in this circuit, locking to ground at contact 4 of relay B(3) independent of relay ST(3). Relay SB(3) at contact 2 closes a circuit from ground through the windings of relays M(3) and S(3), contact 2 of relay SB(3), sleeve conductor 302, winding of relay S(2), contact 6 of relay D(2), resistance D(2), contact 2 of relay CO(2), sleeve contact of jack 250 to battery on the sleeve of the test cord. Relay S(2) operates in this circuit and in turn operates relay S1(2). Relay S1(2) locks in a circuit from battery through its lower winding and contact 1, contact 4 of relay D(2) to ground at contact 1 of relay CO(2). Relay CO1(2) lights the busy lamp BY(2) and locks over its contact 3 to ground at contact 4 of relay S1(2). Relay S(3) operates relay SA(3). Relay M(3) connects ground in shunt of the winding of relay MA(3) to release that relay if it operated momentarily following the operation of relay SB(3).

When the dial in the test cord is operated, relay A(3) releases in response to each interruption of the dialing circuit, closing a circuit from the ground over contact 2 of relay A(3), contact 2 of relay B(3), normal vertical contact 303, winding of relay C(3), winding of vertical magnet 354 to battery. Selector 350 is advanced in the vertical direction under the control of magnet 354. At the first vertical step, contact 304 is closed followed by the opening of contact 303, the circuit of magnet 354 and relay C(3) then extending over contact 3 of relay C(3) and contact 304 in place of normal contact 303. Relays B(3) and C(3) being slow to release remain operated during the dialing of the digit. At the end of the digit relay A(3) remains operated, holding relay B(3) operated and holding the circuit of relay C(3 opened long enough to permit that relay to release.

The selector is now ready to receive a second digit. Since the test man will not know which trunk is connected to the line on which the permanent signal occurred, he will dial a digit, for example the digit 1, which will cause the selector to rotate into engagement with the first of the permanent signal trunks in the selected level. When relay A(3) releases in response to the second digit a circuit is closed from ground over contact 2 of relay A(3), contact 2 of relay B(3), off-normal contact 304 contact 2 of relay C(3), winding of relay E(3), winding of rotary magnet 355 to battery. Magnet 355 operates to rotate selector 350 one step. Relay E(3) operates in series with magnet 355, short-circuiting relay D(3) and disconnecting ground from the sleeve brush 351 during pulsing.

With the selector advanced to the first permanent signal holding trunk the test man may listen to determine whether the trunk is connected to a subscriber's line by operating a key which disconnects battery from the sleeve of jack 250, thereby releasing relays S(2), M(3) and S(3). Relay S(3) releases relay SA(3). Relay M(3), released, opens the shunt around relay MA(3) permitting that relay to operate in a circuit from battery through resistance B(3), winding of relay MA(3), contact 1 of relay SB(3) and contact 3 of relay B(3) to ground. Relay MA(3) operates relays SC(3) and CT(3) and closes a circuit from battery through the winding of relay A(3), resistances T(3) and A(3), contact 3 of relay MA(3), back contact of relay SA(3) to ground at contact 6 of relay CT(3) in shunt of resistance R(3), winding of relay D(3) and ground, holding relays A(3) and B(3) operated, but not operating relay D(3). Relay CT(3), operated, opens the previously traced circuit for relays A(3), ST(3) and D(3) and connects the tip and ring contacts of jack 250 to brushes 352 and 353 of selector 350. Tone connected to the ring conductor 406 of the subscriber's line is transmitted through condenser R(4) to conductor 203 and may be heard by the test man. If no tone is heard, he may restore the key, reconnecting battery to the sleeve of the jack and returning the selector to its previous condition, and then dial an additional digit to advance the selector to the next permanent signal holding trunk.

When connection has been made with the desired permanent signal holding trunk, for example the trunk of Fig. 4, the maintenance man will restore the dial key, which momentarily opens the sleeve conductor and then connects high resistance battery to that conductor. Opening the sleeve conductor releases relays M(3) and S(3) as previously described, but the reclosure of that conductor to battery through a high resistance reoperates relay S(3) before slow-to-release relay SA(3) can release and so holds that relay operated. Relay M(3) does not reoperate. As a result of these operations, relay MA(3) operates, operating relays CT(3) and A(3) in a local circuit and therefore holding relays B(3) and SB(3) operated. Since relay SA(3) is held operated, the shunt around the winding of relay D(3) is open and that relay also operates, closing a circuit from battery through resistance S(3), contact 1 of relay MA(3), contact 2 of relay D(3), contact 1 of relay E(3), brush 351, conductor 201, contact 7 of relay AN(4), winding of relay CO(4) and ground. Relay CO(4) operates in this circuit, connecting conductors 202 and 203 to the tip and ring conductors 405 and 406 which are connected through the trunk and line switch frames to the subscriber's line, thus providing a connection free of central office equipment by which the line may be tested. Relay CO(4) also performs the other functions described in connection with the seizure of the line from the local test desk.

The test man may leave the test trunk connected with the selected permanent signal holding trunk while he traces the call to the subscriber's line. To do this he merely removes the test cord from jack 250. Relay CO(2) releases, connecting high resistance battery to the circuit of relay S(2) and relays S(3) and M(3) in the selector circuit. The effect of the release of relay M(3) is the same as described previously, relays A(3), B(3) and SB(3) being held operated to hold the selector.

When the maintenance man is ready to disconnect from the permanent signal holding trunk, he removes the test cord from the jack 250, if he has not already done so, and operates key 251. With relay CO(2) released, the operation of key 251 closes a circuit for relay D(2), which operates, opening the locking circuit of relay S1(2) and locking over contact 4 of relay CO(2), contact 2 of relay S1(2), contact 3 of relay D(2), contact 3 of relay CO1(2) to ground at contact 4 of relay S1(2). At contact 5, relay D(2) connects battery through low resistance B(2) to the windings of relays S(2), M(3) and S(3) holding relay S(2) operated to in turn hold relays S1(2), CO1(2) and D(3) operated. Relay M(3) reoperates to shunt relay MA(3) and cause that relay to release, in turn releasing relays CT(3), SC(3), A(3) and D(3). The release of relay A(3) advances the selector one step and after an interval releases relay B(3) which in turn releases relay SB(3). With relays A(3) and B(3) released, the release magnet 356 of the selector operates to restore the selector to normal. The release of relay SB(3) opens the circuit of relays S(3), M(3) and S(2) causing these relays to release. Since relay D(2) has opened the locking circuit of relay S1(2), the latter relay now releases after an interval determined by its slow-releasing character, releases relays CO1(2) and D(2) and thereby restores the test trunk to normal.

Assuming that the permanent signal has been caused by leaving the receiver off the hook, the subscriber may restore the receiver at any time. The effect of this action varies with the operations which have taken place in the permanent signal holding trunk and the associated circuits.

If the permanent signal condition is removed before the class of line signal is responded to, either by the test man or the switchboard operator, the circuit of relay S(4) is opened and that relay releases, in turn releasing relays S1(4) and S2(5). Relay S1(4) removes the class of line signal from conductor 407 while relay S2(5) extinguishes the class of line lamp NC(2) at the local test desk.

If the concentrating circuit has not found the holding trunk so that relay B(5) has not operated, relay S1(4) disconnects battery from conductor 508 releasing relay ST(6) in the concentrating circuit, restoring that circuit to normal. If the concentrating circuit has found the trunk and operated relay B(5), the release of relay S2(5) disconnects battery from the winding of relay S(7) releasing that relay to in turn release relays E(7), CO(6), DS(7) and BY(7) and to restore the concentrating circuit to normal. The release of relay S2(5) also restores the timing circuit 504 to normal and releases relays B(5) and relays PB(4) or C(4) if they are operated, the latter relays extinguishing the corresponding lamps at the local test desk. At contact 5 relay S2(5) disconnects ground from conductor 505 releasing the trunk link and line link switches and restoring the connection to normal.

After the operator has answered, relay AN(4) is held operated under her control, in turn holding relay S2(5) operated independent of relays S(4) and S1(4). Removal of the permanent signal condition releases relay S(4) and in turn relay S1(4). The release of relay S1(4) removes the class of line signal from conductor 407, in turn releasing relay NC(9), which was assumed to be operated in the foregoing description. With relay NC(9) released negative battery is removed at contacts 1 and 4 and ground is connected over contact 2 of relay NC(9) to the ring signaling circuit as previously traced, causing relay NC(11) to release, in turn releasing relay NC1(12) and extinguishing lamp NC(11). This lamp is extinguished as above described when the operator has operated either the ringing key or the howler key. If the light remains out after either key is restored, the operator removes the cords from the jacks thereby releasing relay AN(4) as previously described. Since relay S(4) is now also released, relay S2(5) releases and the permanent signal holding trunk is restored to normal as above described.

If the subscriber disconnects while the howler tone is being applied, relay L(8) will release, in turn releasing relay H(8) and relay L1(8). Relay H(8), in releasing, in turn releases relay HC(9) to remove the "howler tone on" signal from the interoffice trunk. Relay L1(8) released, with relays H1(8) and HL(6) operated, closes a circuit from ground over contact 6 of relay H1(8), contact 1 of relay L1(8), conductor 822, contact 7 of relay HL(6) conductor 611, winding of relay SD(9) to battery. Relay SD(9) connects positive battery through ballast lamp CN(9) over conductor 912, contact 6 of relay E(7) conductor 911, contact 2 of relay SD(9) to conductor 904 and the tip signaling circuit. Relay SD(9) also connects negative battery through ballast lamp NP(9), contact 5 of relay NC(9), contact 3 of relay SD(9) to conductor 903 and the ring signaling circuit. At the attended office relays H(11) and NC(11) operate, in turn operating relays H1(12) and NC1(12). With relays H1(12) and NC1(12) operated relay S1(12) is released and a circuit is closed from ground over contact 3 of relay H1(12), contact 0 of relay NC1(12) to the winding of relay S2(12) and battery. With relay S1(12) released and relay S2(12) operated, the circuit of lamp SUPV(14) is transferred from interrupted ground to steady ground causing that lamp to light steadily as an indication that the permanent signal condition has been removed.

Relay SD(9) also opens the circuit of relay DS(7) which releases, in turn releasing relays S(7), AN(4), BY(7), E(7) and CO(6). The release of relay AN(4) releases relay S2(5) and disconnects the trunk circuit from the concentrating circuit. Relay S2(5) disconnects ground from conductor 505 thereby immediately restoring the switches connecting the line with the permanent signal trunk and restoring the line to service.

While the plug is in the jack of the permanent signal holding trunk at the local test desk, relay CO(4) is operated and relay S1(4) is held operated over contact 4 of relay CO(4) and contact 3 of relay S2(5), relay S1(4) holding relay S2(5) operated. Therefore lamp NC(2) remains lighted. When the cord plug is removed, relays CO(4), S1(4) and S2(5) release and the lamp is extinguished.

No disconnect signal is given to the remote test desk and the line and holding trunk are held under the control of relay CO(4) but, when the test man listens as previously described, the release of relay S(4), having removed tone from the ring conductor, this absence of tone indicates that the permanent signal has been removed. The test trunk, permanent signal holding trunk and line are then released as described heretofore.

The functions of the permanent signal holding trunk and associated circuits in case the line involved is a private branch exchange line are similar to those described above. In this case the marker operates relay PB(4), which locks to conductor 507. With relay PB(4) operated, lamp PB(2) at the local test desk is lighted in a circuit from battery through lamp PB(2), conductor 409, contact 5 of relay PB(4) to ground at contact 3 of relay FL(5). The class of line signal to conductor 407 is connected over contact 2 of relay PB(4) and contact 1 of relay S1(4) to 130-volt negative battery through resistance lamp PB(4), causing the operation of marginal relay PB(9) as well as relay NC(9). Relay PB(9) at contact 1 opens the circuit of relay HL(6) to prevent the connection of the subscriber's line to the howler circuit. At contact 6 relay PB(9) connects ground to the ring signaling circuit and at contact 3 extends the tip signaling circuit over contact 4 of relay NC(9) to 130-volt negative battery through resistance lamp NP(9). In response to this signal relay PB(11) operates, in turn operating relay PB1(12) over conductor 1109, which closes a circuit from battery over interrupter 1200, contact 7 of relay SL1(12), contact 1 of relay H1(12), contact 1 of relay PB1(12) and conductor 1207 to lamp PBX(11), and ground, causing that lamp to flash.

In general the operator will perform the same acts as for a non-coin line. However, howler tone should not be connected to a private branch exchange line and means is provided to prevent such application if the operator inadvertently operates the howler key HLR(14) while connected with a private branch exchange line. It will be remembered that, in response to the operation of key HLR(14), relays H2(12) and R(12) operated, in turn operating relay H3(12). With relay H2(12) operated, relay PB1(12) is locked over contact 3 of relay PB1(12) and contact 1 of relay H2(12). With relay PB1(12) operated an "operator answer" signal is substituted for the "apply howler tone" signal normally applied by relay H3(12).

In connection with a coin line, the operator may ring and apply the howler tone as described, but in addition may make other attempts to clear the line based on the fact that the line is equipped with a coin box.

The marker, having the information that the calling line is a coin line, operates relay C(4). Relay C(4) locks under the control of relay S2(5), lights lamp CN(2) at the local test desk and connects positive 130-volt battery through resistance C(4) over contact 3 of relay S1(4), contact 2 of relay C(4) and contact 1 of relay PB(4) to the class of line signaling conductor 407. Resistance C(4) is high enough to reduce the current flow over the signaling conductor so that relays NC(9) and CN(9) operate but marginal relay PB(9) does not operate. With relays CN(9) and NC(9) operated, positive 130-volt potential is connected over contact 3 of relay NC(9), contact 1 of relay CN(9), conductor 902, contact 9 of relay CO(6), conductor 603, contact 1 of relay NC(9), contact 7 of relay PB(9), contact 4 of relay HC(9), contact 4 of relay SD(9) to conductor 903 and the ring signaling circuit, causing relay CN(11) to operate in the permanent signal trunk at the attended office. Relay CN(11) over conductor 1110 operates relay CN1(12) and causes lamp CN(11) to flash. The operator will respond to this signal in the manner previously described and may challenge, ring and cause howler to be applied to the line as previously described.

In addition, knowing the line to be a coin line, the operator will attempt to clear the permanent signal by returning or collecting the coin in the coin box using the cord of Fig. 13. Since the call has been unsuccessful she will first attempt to return the coin. To do this she will first operate key R(13) in here position circuit. The operation of key R(13) closes a circuit from battery through the winding of relay CR(13), normal contact of key C(13), operated contact of key R(13), contact 1 of relay CC(13), contact 3 of relay RB(13) to ground. Relay CR(13) operates, locking over normal contacts of key C(13), contact 2 of relay CR(13) to ground at contact 3 of relay RB(13), independent of key R(13). At contact 6, relay CR(13) lights lamp CC(13) to indicate that the position is set for coin control and at contact 7 operates relay CA(13).

The operator will now operate the ring-rear key, operating relays R(13) and RR(13) as described for ringing. Relay RR(13) at contact 2 closes a locking circuit for relay CR(13) over contact 4 of the latter relay, and operates relay RB(13). At contact 1 relay RR(13) closes a circuit from coin return battery through resistance lamp R(13), contact 8 of relay CR(13), contact 1 of relay RR(13) to ground at contact 2 of relay RB(13). Relay RB(13) is slow to operate and, during its operate time, resistance lamp R(13) is heated to increase its resistance before applying the coin battery to the line. When relay RB(13) disconnects ground at its contact 2, the coin return circuit is extended over contact 3 of relay CR(13), winding of relay CP(13), contact 4 of relay RR(13), contact 13 of relay R(13), ring contact of plug 1300 and jack ANS-CN(11), contact 10 of relay SL3(11), lower right winding of repeating coil T(11), contact 8 of relay SL3(11), conductor 1206, windings of relay C(12), resistance E(12) to ground. Relay C(12) is a polar relay designed to close its contact 1 in response to positive potential and to close its contact 2 in response to negative potential. Therefore relay C(12) now closes contact 1, operating relay CR(12).

At contact 1, relay CR(12) disconnects ground from the tip signaling circuit and extends that circuit over contact 2 and contact 2 of relay SL1(12) to positive 130-volt battery, causing relay A(10) to operate. Relay A(10) operates relay A1(9). Since the cord of Fig. 13 is being used and relays SL(11) and SL1(12) are operated, positive battery is also connected to the ring signaling circuit, operating relays C(10), CA(9) and C1(9). With relays A1(9) and C1(9) operated, a circuit is closed from ground at contact 1 of relay HL(6), conductor 610, contact 4 of relay R(8), conductor 803, contact 1 of relay D1(9), contact 2 of relay CA(9), contact 5 of relay C1(9), contact 6 of relay B1(9), contact 6 of relay A1(9), conductor 909, contact 3 of relay CC(10), winding of relay CR(10) to battery. Relay CR(10) operates in this circuit and closes a circuit from ground at contact 1 of relay CC(10), contact 1 of relay CR(10), winding of relay LD(10) and battery. Relay LD(10) operates, in turn operating relay CB(10). Relay CB(10) opens the circuit of relay S(4), causing the class of line lamp to be extinguished as previously described by releasing relays CN(11) and CN1(12) in the permanent signal trunk at the operator's position. With relays CR(10) and CB (10) operated, coin return potential is connected through resistance lamp CR(9), contact 1 of relay A1(9), contact 4 of relay C1(9), conductor 908, contact 4 of relay CR(10), winding of relay CS(10), contacts 4 and 3 of relay CB(10) through resistances A1(10) and A2(10) and contacts 2 and 5 of relay CB(10) in parallel to the left windings of repeating coil T(10), and thence as previously traced to the tip and ring conductors of the subscriber's line.

The release of relay CN(11) and relay CN1(12), above mentioned, also closes a circuit from ground over contact 2 of relay H1(12), contact 2 of relay PB1(12), contact 2 of relay NC1(12), contact 2 of relay CN1(12), contact 5 of relay SL1(12), winding of relay S(12) to battery. Relay S(12) connects ground over its contact 1, conductor 1208, and contact 4 of relay SL2(11) to the upper winding of relay SL(11), reducing the resistance in series with lamp RL(13), causing that lamp to light.

If there is a coin in the chute of the coin box, relay CS(10) operates connecting ground to conductor 907 and operating relay HC(9). Relay HC(9) at contact 1 disconnects ground from the tip signaling circuit and connects that circuit to positive battery over its contact 2, conductor 911 and contact 6 of relay E(7). Relay H(11) is therefore operated, in turn operating relay H1(12). Relay H1(12) at contact 3 connects ground over contact 5 of relay NC1(12) and contact 1 of relay H3(12) through resistance F(12) in parallel with resistance E(12) to the circuit above traced for relays C(12) and CP(13), reducing the resistance in this circuit so that relay CP(13) now operates, connecting ground to the winding of relay CA(13) in shunt of battery through resistance L(13) and causing relay CA(13) to release and complete a circuit from ground at the contact of relay CP(13), back contact of relay CA(13) to lamp CP(13), resistance N(13) and battery, lighting lamp CP(13) to inform the operator that a coin is in the coin box.

The operator will then restore the ring-rear key, releasing relays R(13), RR(13) and RB(13), in turn releasing relays CR(13) and CP(13) and removing coin return battery from the ring contact of plug 1300. In the trunk circuit, relay C(12) releases in turn releasing relay CR(12). Relay CR(12) disconnects positive battery from the tip signaling circuit and connects ground thereto, thereby releasing relays A(10) and A1(9) at the concentrating circuit. The release of relay A1(9) disconnects coin return battery from the subscriber's line and releases relay CR(10). Relay CR(10) is slow to release, holding relays LD(10) and CB(10) operated for an interval after the removal of coin battery to permit the line to discharge through resistances CA(10) and CB(10) and condenser D(10) during the release time of relay CR(10).

When relay CR(10) releases, ground is connected, during the release time of relay LD(10) to the line through resistance CA(10) and to condenser D(10) through resistance CB(10) to complete the discharge of the line conductors and to discharge condenser D(10).

With relay CB(10) released the line is again connected to relay S(4) and, if the permanent signal condition was not removed lamp CN(11) will be relighted. If lamp CN(11) is not lighted the operator may check that the coin has been returned by releasing and reoperating key R(13), followed by the ring-rear key. With no coin in the chute, relay CS(10) does not operate and lamp CP(13) does not light.

If the coin return key does not clear the condition the operator may try to collect the coin. The operation in this case is similar to that above described, substituting key C(13) and relay CC(13) for key R(13) and relay CR(13). Since negative coin battery is employed relay C(12) closes its contact 2, operating relay CC(12). Relay CC(12) transmits negative battery over the tip signaling circuit, operating relay B(10) in place of relay A(10). Relay B1(9) is operated, in turn operating relay CC(10), and connecting coin collect potential through resistance lamp CC(9) to the line.

What is claimed is:

1. In a telephone system, subscribers' lines at one office, an operator's position at said one office, an operator's position at a distant office, a permanent signal trunk circuit, means responsive to a permanent signal condition on one of said lines to connect said line with said trunk circuit, means in said trunk circuit to operate a signal at both of said positions, means under the control of either position to connect with said trunk circuit, and means responsive to such connection to prevent an effective connection of the other position with said trunk circuit.

2. In a telephone system, subscribers' lines of a plurality of classes at one office, a permanent signal trunk circuit at said office, a local operator's position at said one office, a jack for said trunk circuit at said local position, class of line lamps individual to said jack, a distant office, a distant operator's position at said distant office, an interoffice trunk connecting said one office with said distant operator's position, class of line jacks and lamps individual to said interoffice trunk at said distant operator's position, means responsive to a permanent signal condition on one of said lines to connect said line with said trunk circuit, means responsive to the connection of said line with said trunk circuit to connect said trunk circuit with said interoffice trunk, means to register the class of said calling line in said trunk circuit, means under the control of said class registering means to selectively operate said class of line lamps at said local operator's position and at said distant operator's position, cord circuits at each of said positions, and means in said trunk circuit operated over said interoffice trunk responsive to the insertion of a cord in a trunk jack at said distant operator's position to render the subsequent insertion of a cord in the trunk jack at said local operator's position ineffective.

3. In a telephone system, subscribers' lines of a plurality of classes at one office, a permanent signal trunk circuit at said office, a local operator's position at said one office, a jack for said trunk circuit at said local position, class of line lamps individual to said jack, a distant office, a distant operator's position at said distant office, an interoffice trunk connecting said one office with said distant operator's position, class of line jacks and lamps individual to said interoffice trunk at said distant operator's position, means responsive to a permanent signal condition on one of said lines to connect said line with said trunk circuit, means responsive to the connection of said line with said trunk circuit to connect said trunk circuit with said interoffice trunk, means to register the class of said calling line in said trunk circuit, means under the control of said class registering means to selectively operate said class of line lamps at said local operator's position and at said distant operator's position, cord circuits at each of said positions, means in said trunk circuit operated over said interoffice trunk responsive to the insertion of a cord in a trunk jack at said distant operator's position to render the subsequent insertion of a cord in the trunk jack at said local operator's position ineffective, and means responsive to the insertion of a cord in the trunk jack at said local operator's position prior to the insertion of a cord in the trunk jack at said distant operator's position to extinguish the class of line signal at said distant operator's position.

4. In a telephone system, subscribers' lines of a plurality of classes at one office, a permanent signal trunk circuit at said office, a local operator's position at said one office, a jack for said trunk circuit at said local position, class of line lamps individual to said jack, a distant office, a distant operator's position at said distant office, an interoffice trunk connecting said one office with said distant operator's position, class of line jacks and lamps individual to said interoffice trunk at said distant operator's position, means responsive to a permanent signal condition on one of said lines to connect said line with said trunk circuit, means in said trunk circuit operated over said interoffice trunk responsive to the connection of said line with said trunk circuit to connect said trunk circuit with said interoffice trunk, means to register the class of said calling line in said trunk circuit, means under the control of said class registering means to selectively operate said class of line lamps at said local operator's position and at said distant operator's position, cord circuits at each of said positions, means responsive to the insertion of a cord in a trunk jack at said distant operator's position to render the subsequent insertion of a cord in the trunk jack at said local operator's position ineffective, means responsive to the insertion of a cord in the trunk jack at said local operator's position prior to the insertion of a cord in the trunk jack at said distant operator's position to extinguish the class of line signal at said distant operator's position, and to disconnect said trunk circuit from said interoffice trunk.

5. In a telephone system, subscribers' lines of a plurality of classes at one office, a permanent signal trunk circuit at said one office, a distant office, an operator's position at said distant office, an interoffice trunk, connecting said one office with said operator's position, means responsive to a permanent signal condition on one of said lines to connect said line with said trunk circuit, means responsive to the connection of said one line with said trunk circuit to connect said trunk circuit with said interoffice trunk, a plurality of signal means at said one office, means operable over said interoffice trunk for connecting each of said signal means over said trunk circuit to said one line, class of line indicating means individual to said interoffice trunk at said distant office, means to register the class of said calling line in said trunk circuit, means under the control of said class registering means for selectively operating said class indicating means, and means under the control of said operator's position for selectively operating said signal connecting means.

6. In a telephone system, subscribers' lines of a plurality of classes at one office, a permanent signal trunk circuit at said one office, a distant office, an operator's position at said distant office, a two-wire interoffice trunk connecting said one office with said operator's position, means responsive to a permanent signal condition on one of said lines to connect said line with said trunk circuit, means responsive to the connection of said one line with said trunk circuit to connect said trunk circuit with said interoffice trunk, a plurality of signal means at said one office, means operable over said interoffice trunk for connecting each of said signal means over said trunk circuit to said one line, class of line indicating means individual to said interoffice trunk at said distant office, means to register the class of said calling line in said trunk circuit, means under the control of said class registering means for selectively operating said class indicating means, means under the control of said operator's position for selectively operating said signal connecting means, said last two means operable over the two wires of said interoffice trunk.

7. In a telephone system, subscribers' lines of a plurality of classes at one office, a permanent signal trunk circuit at said one office, a distant office, an operator's position at said distant office, a two-wire interoffice trunk, connecting said one office with said operator's position, means responsive to a permanent signal condition on one of said lines to connect said line with said trunk circuit, means responsive to the connection of said one line with said trunk circuit to connect said trunk circuit with said interoffice trunk, a plurality of signal means at said one office, means operable over said interoffice trunk for connecting each of said signal means over said trunk circuit to said one line, class of line indicating means individual to said interoffice trunk at said distant office, means to register the class of said calling line in said trunk circuit, means under the control of said class registering means for selectively operating said class indicating means, means under the control of said operator's position for selectively operating said signal connecting means, said last two operating means comprising the two ends of a full-duplex signaling circuit operable over the two wires of said interoffice trunk whereby said class indicating means and said signal connecting means may be operated independent of the other.

8. In a telephone system, subscribers' lines of a plurality of classes at one office, a permanent signal trunk circuit at said one office, a distant office, an operator's position at said distant office, an interoffice trunk connecting said one office with said operator's position, means responsive to a permanent signal condition on one of said lines to connect said lines with said trunk circuit, means responsive to the connection of said one line with said trunk circuit to connect said trunk circuit with said interoffice trunk, a plurality of signal means at said one office, means operable over said interoffice trunk for connecting each of said signal means over said trunk circuit to said one line, a class of line indicating means individual to said interoffice trunk at said distant office, means to register the class of said calling line in said trunk circuit, means under the control of said class registering means for selectively operating said class indicating means, means under the control of said operator's position for selectively operating said signal connecting means, and means under the control of the operating means for a particular one of said class indicating means to prevent the operation of a particular one of said signal connecting means.

9. In a telephone system, subscribers' lines of a plurality of classes at one office, a permanent signal trunk circuit at said one office, a distant office, an operator's position at said distant office, an interoffice trunk connecting said one office with said operator's position, means responsive to a permanent signal condition on one of said lines to connect said line with said trunk circuit, means responsive to the connection of said one line with said trunk circuit to connect said trunk circuit with said interoffice trunk, signal controlling means individual to said interoffice trunk at said one office, including means for applying ringing current to said line, means for applying coin current to said line, and means for applying howler tone to said line, class of line indicating means individual to said interoffice trunk at said distant office, including a coin line indication, a P. B. X line indication and a regular line indication, means to register the class of said calling line in said trunk circuit, means under the control of said registering means for selectively operating said class indicating means, means under the control of said operator's position for selectively operating said signal controlling means, and means under the control of the operating means for said P. B. X line indication to prevent the operation of said means for applying howler tone to said line.

JOSEPH MICHAL.

REFERENCES CITED

The following references are of record in the file of this patent:

UNITED STATES PATENTS

| Number | Name | Date |
|---|---|---|
| 1,569,677 | Powell | Jan. 12, 1926 |
| 1,569,678 | Powell | Jan. 12, 1926 |
| 1,655,602 | Gardner | Jan. 10, 1928 |
| 1,667,015 | Stazak | Apr. 24, 1928 |
| 2,143,971 | Brazelton | Jan. 17, 1939 |
| 2,183,649 | Kahn | Dec. 19, 1939 |
| 2,183,656 | Ostline | Dec. 19, 1939 |
| 2,258,980 | Eagon et al. | Oct. 14, 1941 |
| 2,372,022 | Schneckloth | Mar. 20, 1945 |